US009685163B2

(12) United States Patent
Sen et al.

(10) Patent No.: US 9,685,163 B2
(45) Date of Patent: Jun. 20, 2017

(54) TRANSFORMING SPHERICAL HARMONIC COEFFICIENTS

(71) Applicant: QUALCOMM Incorporated, San Diego, CA (US)

(72) Inventors: Dipanjan Sen, San Diego, CA (US); Martin James Morrell, San Diego, CA (US); Nils Günther Peters, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 14/192,829

(22) Filed: Feb. 27, 2014

(65) Prior Publication Data

US 2014/0247946 A1 Sep. 4, 2014

Related U.S. Application Data

(60) Provisional application No. 61/771,677, filed on Mar. 1, 2013, provisional application No. 61/860,201, filed on Jul. 30, 2013.

(51) Int. Cl.

| | |
|---|---|
| ***G06F 17/00*** | (2006.01) |
| ***G10L 19/008*** | (2013.01) |
| ***G10L 19/16*** | (2013.01) |

(52) U.S. Cl.
CPC .......... *G10L 19/008* (2013.01); *G10L 19/167* (2013.01); *H04S 2420/11* (2013.01)

(58) Field of Classification Search
CPC ... G10L 19/008; G10L 19/167; H04S 2420/11
See application file for complete search history.

(56) References Cited

U.S. PATENT DOCUMENTS 5,594,800 A 1/1997 Gerzon
6,021,206 A 2/2000 McGrath
(Continued)

FOREIGN PATENT DOCUMENTS

CN 102333265 A 1/2012
EP 2450880 A1 5/2012
(Continued)

OTHER PUBLICATIONS

Daniel et al., "Multichannel Audio Coding Based on Minimum Audible Angles," Proceedings of 40th International Conference: Spatial Audio: Sense the Sound of Space, Oct. 8, 2010, 10 pp.
(Continued)

*Primary Examiner* — Joseph Saunders, Jr.
(74) *Attorney, Agent, or Firm* — Shumaker & Sieffert, P.A.

(57) ABSTRACT

In general, techniques are described for transforming spherical harmonic coefficients. A device comprising one or more processors may perform the techniques. The processors may be configured to parse the bitstream to determine transformation information describing how the sound field was transformed to reduce a number of the plurality of hierarchical elements that provide information relevant in describing the sound field. The processors may further be configured to, when reproducing the sound field based on those of the plurality of hierarchical elements that provide information relevant in describing the sound field, transform the sound field based on the transformation information to reverse the transformation performed to reduce the number of the plurality of hierarchical elements.

60 Claims, 13 Drawing Sheets

(56) References Cited

U.S. PATENT DOCUMENTS

| | | | | |
|---|---|---|---|---|
| 6,259,795 | B1 | 7/2001 | McGrath | |
| 2005/0035965 | A1 | 2/2005 | Sloan et al. | |
| 2008/0001947 | A1 | 1/2008 | Snyder et al. | |
| 2009/0083045 | A1 | 3/2009 | Briand et al. | |
| 2012/0128160 | A1 | 5/2012 | Kim et al. | |
| 2012/0155653 | A1 | 6/2012 | Jax et al. | |
| 2012/0314878 | A1* | 12/2012 | Daniel | G10L 19/20 381/23 |
| 2014/0249827 | A1 | 9/2014 | Sen et al. | |
| 2015/0221313 | A1 | 8/2015 | Purnhagen et al. | |
| 2015/0248889 | A1 | 9/2015 | Dickins et al. | |
| 2015/0332679 | A1 | 11/2015 | Kruger et al. | |

FOREIGN PATENT DOCUMENTS

| | | | |
|---|---|---|---|
| EP | 2469742 | A2 | 6/2012 |
| EP | 2541547 | A1 | 1/2013 |
| JP | H1118199 | A | 1/1999 |
| TW | 200638338 | A | 11/2006 |
| WO | 9215180 | A1 | 9/1992 |
| WO | 0182651 | A1 | 11/2001 |
| WO | 2005109403 | A1 | 11/2005 |
| WO | 2012059385 | A1 | 5/2012 |

OTHER PUBLICATIONS

International Search Report and Written Opinion—PCT/US2014/019468—ISA/EPO—Jan. 29, 2015, 17 pp.

Partial International Search Report—PCT/US2014/019468—ISA/EPO—Oct. 31, 2014, 8 pp.

Robert et al., "A Simple and Efficient Method for Real-Time Computation and Transformation of Spherical Harmonic-Based Sound Fields," Convention Paper 8756, 133rd AES Convention, Oct. 26-29, 2012, 10 pp.

"WD1-HOA Text of MPEG-H 3D Audio," MPEG Meeting; San Jose; (Motion Picture Expert Group or ISO/IEC JTC1/SC29/WG11),, No. N14264, Jan. 2014, 84 pp.

Sen et al., "Diffrences and similarities in formats for scene based audio," ISO/IEC JTC1/SC29/WG11 MPEG2012/M26704, Oct. 2012, 7 pp.

Painter et al., "Perceptual Coding of Digital Audio," Proceedings of the IEEE, vol. 88, No. 4, Apr. 2000, 63 pp.

Poletti, "Unified Description of Ambisonics Using Real and Complex Spherical Harmonics," Ambisonics Symposium 2009, Jun. 25-27, 2009, 10 pp.

"Call for Proposals for 3D Audio," ISO/IEC JTC1/SC29/WG11/N13411, Jan. 2013, 20 pp.

Pulkki, "Spatial Sound Reproduction with Directional Audio Coding," Engineering Reports, J. Audio Eng. Soc., vol. 55, No. 6, Jun. 2007, 14 pp.

Taiwan Search Report, and translation thereof, from Taiwan Application No. TW103107128, dated Nov. 29, 2016, 10 pp.

Taiwan Search Report, and translation thereof, from counterpart Taiwan Application No. TW103107142, dated Oct. 17, 2016, 42 pp.

Jerome, "Spatial Sound Encoding Including Near Field Effect: Introducing Distance Coding Filters and a Viable, New Ambisonic Format," AES 23rd International Conference, Copenhagen, Denmark, May 23-25, 2003, (corrected Jul. 21, 2006), XP040374490, Accessed online [Jul. 8, 2013], 15 pp.

* cited by examiner

TRANSFORMING SPHERICAL HARMONIC COEFFICIENTS

This application claims the benefit of U.S. Provisional Application No. 61/771,677, filed Mar. 1, 2013 and U.S. Provisional Application No. 61/860,201, filed Jul. 30, 2013.

TECHNICAL FIELD

This disclosure relates to audio coding and, more specifically, bitstreams that specify coded audio data.

BACKGROUND

A higher order ambisonics (HOA) signal (often represented by a plurality of spherical harmonic coefficients (SHC) or other hierarchical elements) is a three-dimensional representation of a sound field. This HOA or SHC representation may represent this sound field in a manner that is independent of the local speaker geometry used to playback a multi-channel audio signal rendered from this SHC signal. This SHC signal may also facilitate backwards compatibility as this SHC signal may be rendered to well-known and highly adopted multi-channel formats, such as a 5.1 audio channel format or a 7.1 audio channel format. The SHC representation may therefore enable a better representation of a sound field that also accommodates backward compatibility.

SUMMARY

In general, various techniques are described for signaling audio information in a bitstream representative of audio data and for performing a transformation with respect to the audio data. In some aspects, techniques are described for signaling which of a non-zero subset of a plurality of hierarchical elements, such as higher order ambisonics (HOA) coefficients (which may also be referred to as spherical harmonic coefficients), are included in the bitstream. Given that some of the HOA coefficients may not provide information relevant in describing a sound field, the audio encoder may reduce the plurality of HOA coefficients to a subset of the HOA coefficients that provide information relevant in describing the sound field, thereby increasing the coding efficiency. As a result, various aspects of the techniques may enable specifying in the bitstream that includes the HOA coefficients and/or encoded versions thereof, those of the HOA coefficients that are actually included in the bitstream (e.g., the non-zero subset of the HOA coefficients that includes at least one of the HOA coefficients but not all of the coefficients). The information identifying the subset of the HOA coefficients may be specified in the bitstream as noted above, or in some instances, in side channel information.

In other aspects, techniques are described for transforming SHC so as to reduce a number of SHC that are to be specified in the bitstream and thereby increase coding efficiency. That is, the techniques may perform some form of a linear invertible transform with respect to the SHC with the result of reducing the number of SHC that are to be specified in the bitstream. Examples of a linear invertible transform include rotation, translation, a discrete cosine transform (DCT), a discrete Fourier transform (DFT), and vector-based decompositions. Vector-based decompositions may involve transformation of the SHC from a spherical harmonics domain to another domain. Examples of vector-based decomposition may include a singular value decomposition (SVD), a principal component analysis (PCA), and a Karhunen-Loeve transform (KLT). The techniques may then specify "transformation information" identifying the transformation performed with respect to the SHC. For example, when a rotation is performed with respect to the SHC, the techniques may provide for specifying rotation information identifying the rotation (often in terms of various angles of rotation). When SVD is performed as another example, the techniques may provide for a flag indicating that SVD was performed.

In one example, a method of generating a bitstream representative of audio content, the method comprises identifying, in the bitstream, a plurality of hierarchical elements describing a sound field that are included in the bitstream, and specifying, in the bitstream, the identified plurality of hierarchical elements.

In another example, a device configured to generate a bitstream representative of audio content, the device comprises one or more processors configured to identify, in the bitstream, a plurality of hierarchical elements describing a sound field that are included in the bitstream, and specify, in the bitstream, the identified plurality of hierarchical elements.

In another example, a device configured to generate a bitstream representative of audio content, the method comprises means for identifying, in the bitstream, a plurality of hierarchical elements describing a sound field that are included in the bitstream, and means for specifying, in the bitstream, the identified plurality of hierarchical elements.

In another example, a non-transitory computer-readable storage medium has stored thereon instructions that, when executed, cause one or more processors to identify, in the bitstream, a plurality of hierarchical elements describing a sound field that are included in the bitstream, and specify, in the bitstream, the identified plurality of hierarchical elements.

In another example, a method of processing a bitstream representative of audio content, the method comprises identifying, from the bitstream, a plurality of hierarchical elements describing a sound field that are included in the bitstream, and parsing the bitstream to determine the identified plurality of hierarchical elements.

In another example, a device configured to process a bitstream representative of audio content, the device comprises one or more processors are configured to identify, from the bitstream, a plurality of hierarchical elements describing a sound field that are included in the bitstream, and parsing the bitstream to determine the identified plurality of hierarchical elements.

In another example, a device configured to process a bitstream representative of audio content, the device comprises means for identifying, from the bitstream, a plurality of hierarchical elements describing a sound field that are included in the bitstream, and means for parsing the bitstream to determine the identified plurality of hierarchical elements.

In another example, a non-transitory computer-readable storage medium has stored thereon instructions that, when executed, cause one or more processors to identify, from the bitstream, a plurality of hierarchical elements describing a sound field that are included in the bitstream, and parse the bitstream to determine the identified plurality of hierarchical elements.

In another example, a method of generating a bitstream comprised of a plurality of hierarchical elements that describe a sound field, the method comprises transforming the sound field to reduce a number of the plurality of hierarchical elements that provide information relevant in describing the sound field, and specifying transformation information in the bitstream describing how the sound field was transformed.

In another example, a device configured to generate a bitstream comprised of a plurality of hierarchical elements that describe a sound field, the device comprises one or more processors configured to transform the sound field to reduce a number of the plurality of hierarchical elements that provide information relevant in describing the sound field, and specify transformation information in the bitstream describing how the sound field was transformed.

In another example, a device configured to generate a bitstream comprised of a plurality of hierarchical elements that describe a sound field, the device comprises means for transforming the sound field to reduce a number of the plurality of hierarchical elements that provide information relevant in describing the sound field, and means for specifying transformation information in the bitstream describing how the sound field was transformed.

In another example, a non-transitory computer-readable storage medium having stored thereon instructions that, when executed, cause one or more processors to transform the sound field to reduce a number of the plurality of hierarchical elements that provide information relevant in describing the sound field, and specify transformation information in the bitstream describing how the sound field was transformed.

In another example, a method of processing a bitstream comprised of a plurality of hierarchical elements describing a sound field, the method comprises parsing the bitstream to determine transformation information describing how the sound field was transformed to reduce a number of the plurality of hierarchical elements that provide information relevant in describing the sound field, and when reproducing the sound field based on those of the plurality of hierarchical elements that provide information relevant in describing the sound field, transforming the sound field based on the transformation information to reverse the transformation performed to reduce the number of the plurality of hierarchical elements.

In another example, a device configured to process a bitstream comprised of a plurality of hierarchical elements describing a sound field, the device comprising one or more processors configured to parse the bitstream to determine transformation information describing how the sound field was transformed to reduce a number of the plurality of hierarchical elements that provide information relevant in describing the sound field, and, when reproducing the sound field based on those of the plurality of hierarchical elements that provide information relevant in describing the sound field, transform the sound field based on the transformation information to reverse the transformation performed to reduce the number of the plurality of hierarchical elements.

In another example, a device configured to process a bitstream comprised of a plurality of hierarchical elements describing a sound field, the device comprises means for parsing the bitstream to determine transformation information describing how the sound field was transformed to reduce a number of the plurality of hierarchical elements that provide information relevant in describing the sound field, and means for transforming, when reproducing the sound field based on those of the plurality of hierarchical elements that provide information relevant in describing the sound field, the sound field based on the transformation information to reverse the transformation performed to reduce the number of the plurality of hierarchical elements.

In another example, a non-transitory computer-readable storage medium has stored thereon instructions that, when executed, cause one or more processors to parse the bitstream to determine transformation information describing how the sound field was transformed to reduce a number of the plurality of hierarchical elements that provide information relevant in describing the sound field, and when reproducing the sound field based on those of the plurality of hierarchical elements that provide information relevant in describing the sound field, transform the sound field based on the transformation information.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
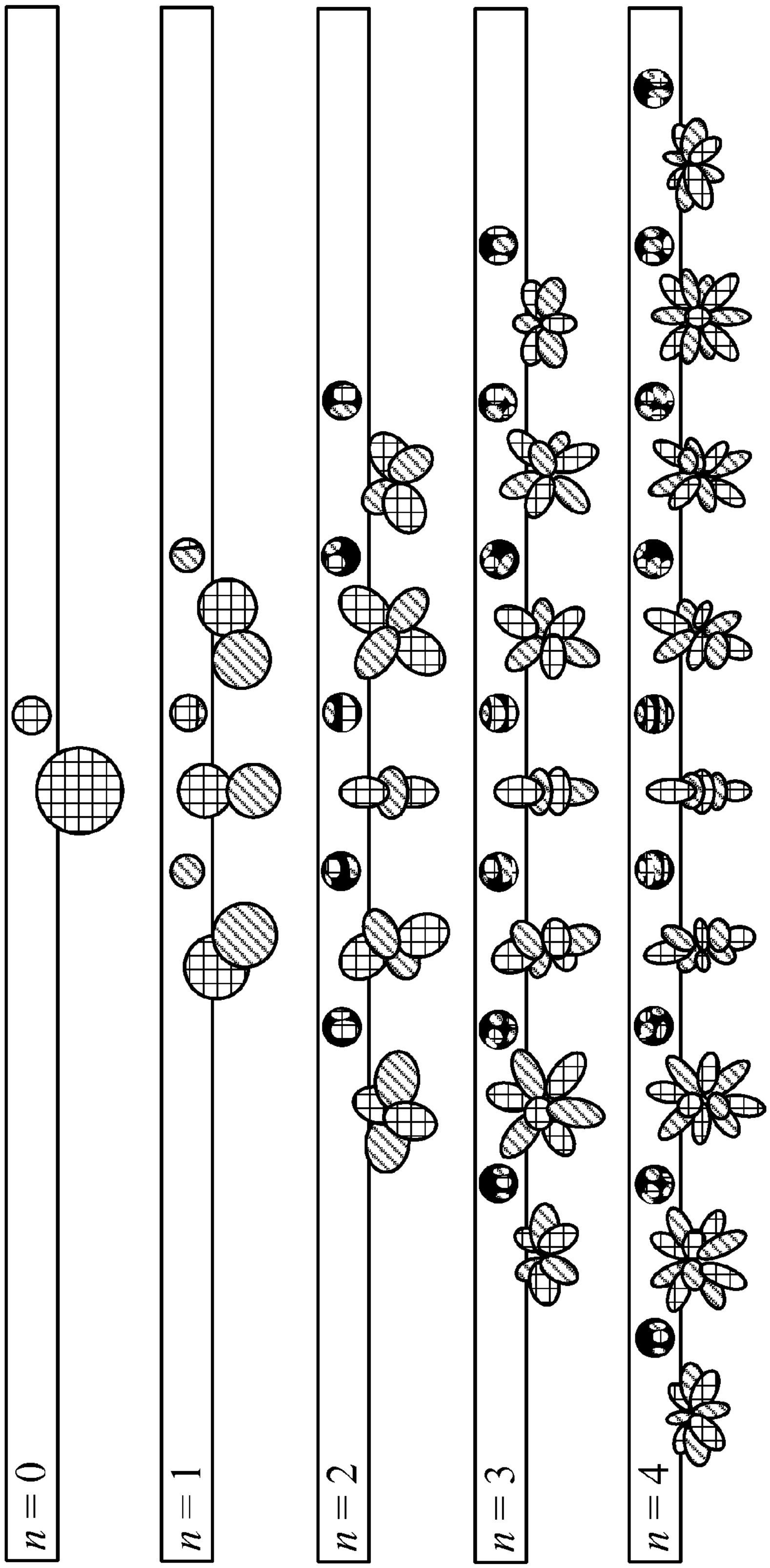
FIGS. 1 and 2 are diagrams illustrating spherical harmonic basis functions of various orders and sub-orders.

The evolution of surround sound has made available many output formats for entertainment nowadays. Examples of such surround sound formats include the popular 5.1 format (which includes the following six channels: front left (FL), front right (FR), center or front center, back left or surround left, back right or surround right, and low frequency effects (LFE)), the growing 7.1 format, and the upcoming 22.2 format (e.g., for use with the Ultra High Definition Television standard). Further examples include formats for a spherical harmonic array.

The input to a future MPEG encoder is optionally one of three possible formats: (i) traditional channel-based audio, which is meant to be played through loudspeakers at prespecified positions; (ii) object-based audio, which involves discrete pulse-code-modulation (PCM) data for single audio objects with associated metadata containing their location coordinates (amongst other information); and (iii) scene-based audio, which involves representing the sound field using coefficients of spherical harmonic basis functions (also called "spherical harmonic coefficients" or SHC).

There are various 'surround-sound' formats in the market. They range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce the soundtrack for a movie once, and not spend the efforts to remix it for each speaker configuration. Recently, standard committees have been considering ways in which to provide an encoding into a standardized bitstream and a subsequent decoding that is adaptable and agnostic to the speaker geometry and acoustic conditions at the location of the renderer.

To provide such flexibility for content creators, a hierarchical set of elements may be used to represent a sound field. The hierarchical set of elements may refer to a set of elements in which the elements are ordered such that a basic set of lower-ordered elements provides a full representation of the modeled sound field. As the set is extended to include higher-order elements, the representation becomes more detailed.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty}\left[4\pi\sum_{n=0}^{\infty} j_n(kr_r)\sum_{m=-n}^{n} A_n^m(k)Y_n^m(\theta_r, \varphi_r)\right]e^{j\omega t},$$

This expression shows that the pressure $p_i$ at any point $\{r_r, \theta_r, \phi_r\}$ of the sound field can be represented uniquely by the SHC $A_n^m(k)$. Here, $$k = \frac{\omega}{c},$$

c is the speed of sound (~343 m/s), $\{r_r, \theta_r, \phi_r\}$ is a point of reference (or observation point), $j_n(\bullet)$ is the spherical Bessel function of order n, and $Y_n^m(\theta_r, \phi_r)$ are the spherical harmonic basis functions of order n and suborder m. It can be recognized that the term in square brackets is a frequency-domain representation of the signal (i.e., $S(\omega, r_r, \theta_r, \phi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

Figure 2:
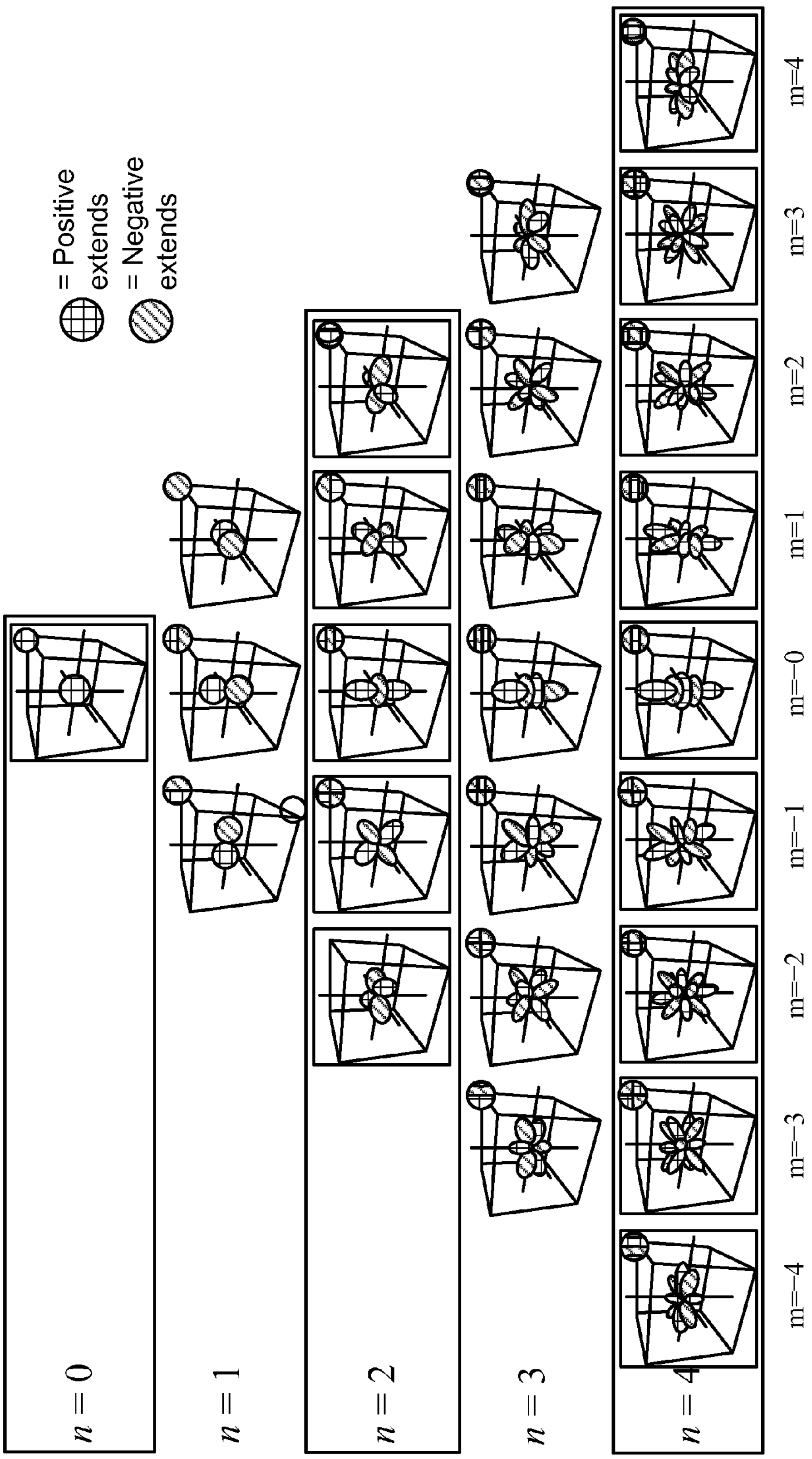

FIG. 2 is another diagram illustrating spherical harmonic basis functions from the zero order (n=0) to the fourth order (n=4). In FIG. 2, the spherical harmonic basis functions are shown in three-dimensional coordinate space with both the order and the suborder shown.

In any event, the SHC $A_n^m(k)$ can either be physically acquired (e.g., recorded) by various microphone array configurations or, alternatively, they can be derived from channel-based or object-based descriptions of the sound field. The former represents scene-based audio input to an encoder. For example, a fourth-order representation involving $1+2^4$ (25, and hence fourth order) coefficients may be used.

To illustrate how these SHCs may be derived from an object-based description, consider the following equation. The coefficients $A_n^m(k)$ for the sound field corresponding to an individual audio object may be expressed as $$A_n^m(k)=g(\omega)(-4\pi ik)h_n^{(2)}(kr_s)Y_n^{m*}(\theta_s,\phi_s),$$

where i is $\sqrt{-1}$, $h_n^{(2)}(\bullet)$ is the spherical Hankel function (of the second kind) of order n, and $\{r_s, \theta_s, \phi_s\}$ is the location of the object. Knowing the source energy $g(\omega)$ as a function of frequency (e.g., using time-frequency analysis techniques, such as performing a fast Fourier transform on the PCM stream) allows us to convert each PCM object and its location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, these coefficients contain information about the sound field (the pressure as a function of 3D coordinates), and the above represents the transformation from individual objects to a representation of the overall sound field, in the vicinity of the observation point $\{r_r, \theta_r, \phi_r\}$. The remaining figures are described below in the context of object-based and SHC-based audio coding.

While SHCs may be derived from PCT objects, the SHCs may also be derived from a microphone-array recording as follows:

$$a_n^m(t)=b_n(r_i,t)*\langle Y_n^m(\theta_i,\phi_i),m_i(t)\rangle$$

where, $a_n^m(t)$ are the time-domain equivalent of $A_n^m(k)$ (the SHC), the * represents a convolution operation, the <,> represents an inner product, $b_n(r_i, t)$ represents a time-domain filter function dependent on $r_i$, $m_i(t)$ are the $i^{th}$ microphone signal, where the $i^{th}$ microphone transducer is located at radius $r_i$, elevation angle $\theta_i$ and azimuth angle $\phi_i$. Thus, if there are 32 transducers in the microphone array and each microphone is positioned on a sphere such that, $r_i$=a, is a constant (such as those on an Eigenmike EM32 device from mhAcoustics), the 25 SHCs may be derived using a matrix operation as follows:

$$\begin{bmatrix} a_0^0(t) \\ a_1^{-1}(t) \\ \vdots \\ a_4^4(t) \end{bmatrix} =$$

$$\begin{bmatrix} b_0(a,t) \\ b_1(a,t) \\ \vdots \\ b_4(a,t) \end{bmatrix} * \begin{bmatrix} Y_0^0(\theta_1,\varphi_1) & Y_0^0(\theta_2,\varphi_2) & \dots & Y_0^0(\theta_{32},\varphi_{32}) \\ Y_1^{-1}(\theta_1,\varphi_1) & Y_1^{-1}(\theta_2,\varphi_2) & \dots & Y_1^{-1}(\theta_{32},\varphi_{32}) \\ \vdots & \vdots & \ddots & \vdots \\ Y_4^4(\theta_1,\varphi_1) & Y_4^4(\theta_2,\varphi_2) & \dots & Y_4^4(\theta_{32},\varphi_{32}) \end{bmatrix} \begin{bmatrix} m_1(a,t) \\ m_2(a,t) \\ \vdots \\ m_{32}(a,t) \end{bmatrix}.$$

The matrix in the above equation may be more generally referred to as $E_s(\theta, \phi)$, where the subscript s may indicate that the matrix is for a certain transducer geometry-set, s. The convolution in the above equation (indicated by the *), is on a row-by-row basis, such that, for example, the output $a_0^0(t)$ is the result of the convolution between $b_0(a, t)$ and the time series that results from the vector multiplication of the first row of the $E_s(\theta, \phi)$ matrix, and the column of microphone signals (which varies as a function of time—accounting for the fact that the result of the vector multiplication is a time series). The computation may be most accurate when the transducer positions of the microphone array are in the so called T-design geometries (which is very close to the Eigenmike transducer geometry). One characteristic of the T-design geometry may be that the $E_s(\theta, \phi)$ matrix that results from the geometry, has a very well behaved inverse (or pseudo inverse) and further that the inverse may often be very well approximated by the transpose of the matrix, $E_s(\theta, \phi)$. If the filtering operation with $b_n(a, t)$ were to be ignored, this property may allow for the recovery of the microphone signals from the SHC (i.e., $[m_i(t)]=[E_s(\theta, \phi)]^{-1}$ [SHC] in this example). The remaining figures are described below in the context of SHC-based audio-coding.

Generally, the techniques described in this disclosure may provide for a robust approach to the directional transformation of a sound field through the use of a spherical harmonics domain to spatial domain transform and a matching inverse transform. The sound field directional transform may be controlled by means of rotation, tilt and tumble. In some instances, only the coefficients of a given order are merged to create the new coefficients, meaning there are no inter-order dependencies such as may occur when filters are used. The resultant transform between the spherical harmonic and spatial domain may then be represented as a matrix operation. The directional transformation may, as a result, be fully reversible in that this directional transformation can be cancelled out by use of an equally directionally transformed renderer. One application of this directional transformation may be to reduce the number of spherical harmonic coefficients required to represent an underlying sound field. The reduction may be accomplished by aligning the region of highest energy with the sound field direction requiring the least number of spherical harmonic coefficients to represent the rotated sound field. Even further reduction of the number of coefficients may be achieved by employing an energy threshold. This energy threshold may reduce the number of required coefficients with no corresponding perceivable loss of information. This may be beneficial for applications that require the transmission (or storage) of spherical harmonics based audio material by removing redundant spatial information rather than redundant spectral information.

Figure 3:
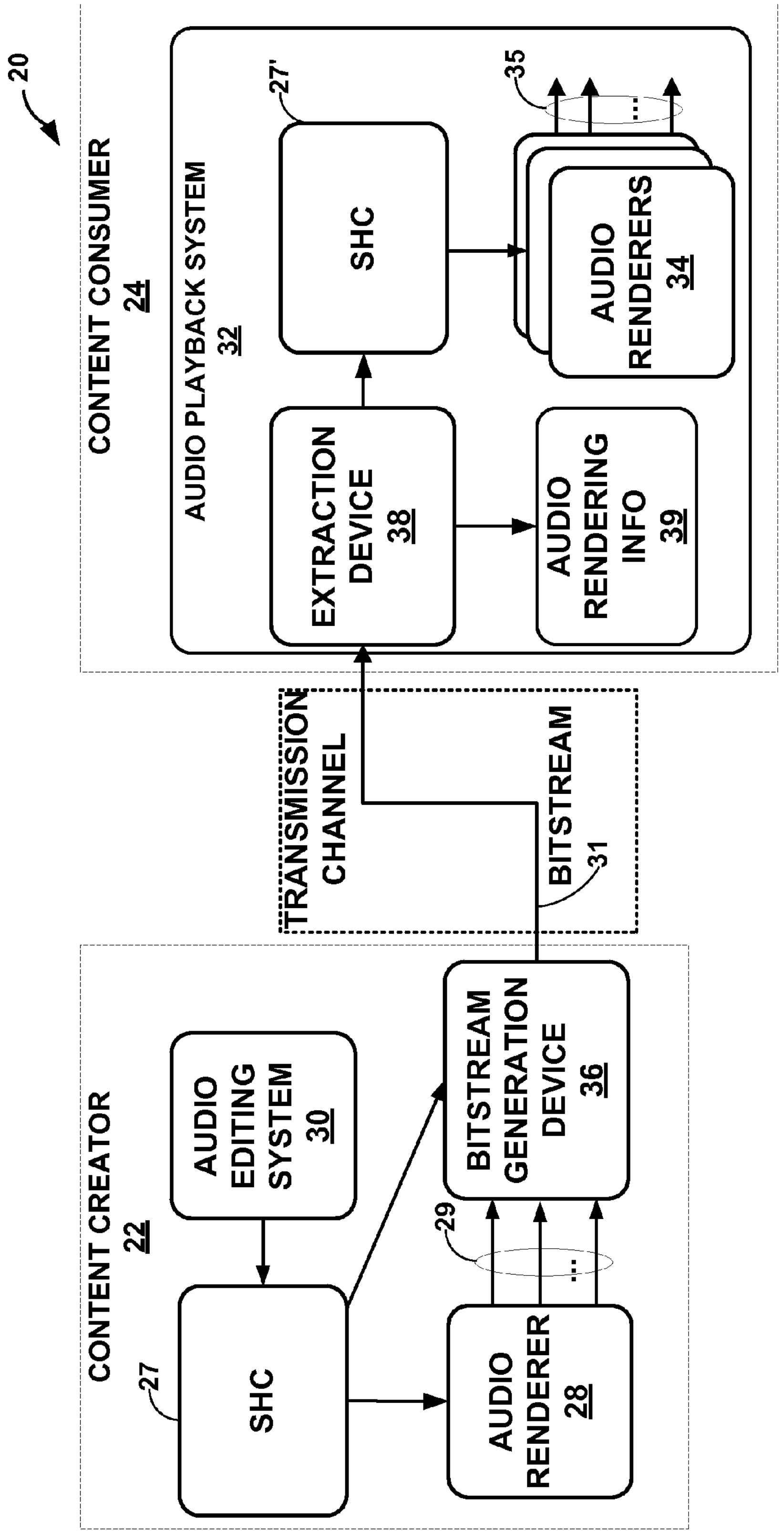
FIG. 3 is a diagram illustrating a system that may implement various aspects of the techniques described in this disclosure.

FIG. 3 is a diagram illustrating a system 20 that may perform the techniques described in this disclosure to potentially more efficiently represent audio data using spherical harmonic coefficients. As shown in the example of FIG. 3, the system 20 includes a content creator 22 and a content consumer 24. While described in the context of the content creator 22 and the content consumer 24, the techniques may be implemented in any context in which SHCs or any other hierarchical representation of a sound field are encoded to form a bitstream representative of the audio data.

The content creator 22 may represent a movie studio or other entity that may generate multi-channel audio content for consumption by content consumers, such as the content consumer 24. Often, this content creator generates audio content in conjunction with video content. The content consumer 24 represents an individual that owns or has access to an audio playback system, which may refer to any form of audio playback system capable of rendering SHC for play back as multi-channel audio content. In the example of FIG. 3, the content consumer 24 includes an audio playback system 32.

The content creator 22 includes an audio editing system 30. The audio renderer 26 may represent an audio processing unit that renders or otherwise generates speaker feeds (which may also be referred to as "loudspeaker feeds," "speaker signals," or "loudspeaker signals"). Each speaker feed may correspond to a speaker feed that reproduces sound for a particular channel of a multi-channel audio system. In the example of FIG. 3, the renderer 28 may render speaker feeds for conventional 5.1, 7.1 or 22.2 surround sound formats, generating a speaker feed for each of the 5, 7 or 22 speakers in the 5.1, 7.1 or 22.2 surround sound speaker systems. Alternatively, the renderer 28 may be configured to render speaker feeds from source spherical harmonic coefficients for any speaker configuration having any number of speakers, given the properties of source spherical harmonic coefficients discussed above. The audio renderer 28 may, in this manner, generate a number of speaker feeds, which are denoted in FIG. 3 as speaker feeds 29.

The content creator may, during the editing process, render spherical harmonic coefficients 27 ("SHC 27"), listening to the rendered speaker feeds in an attempt to identify aspects of the sound field that do not have high fidelity or that do not provide a convincing surround sound experience. The content creator 22 may then edit source spherical harmonic coefficients (often indirectly through manipulation of different objects from which the source spherical harmonic coefficients may be derived in the manner described above). The content creator 22 may employ the audio editing system 30 to edit the spherical harmonic coefficients 27. The audio editing system 30 represents any system capable of editing audio data and outputting this audio data as one or more source spherical harmonic coefficients.

When the editing process is complete, the content creator 22 may generate a bitstream 31 based on the spherical harmonic coefficients 27. That is, the content creator 22 includes a bitstream generation device 36, which may represent any device capable of generating the bitstream 31, e.g., for transmission across a transmission channel, which may be a wired or wireless channel, a data storage device, or the like, as described in further detail below. In some instances, the bitstream generation device 36 may represent an encoder that bandwidth compresses (through, as one example, entropy encoding) the spherical harmonic coefficients 27 and that arranges the entropy encoded version of the spherical harmonic coefficients 27 in an accepted format to form the bitstream 31. In other instances, the bitstream generation device 36 may represent an audio encoder (possibly, one that complies with a known audio coding standard, such as MPEG surround, or a derivative thereof) that encodes the multi-channel audio content 29 using, as one example, processes similar to those of conventional audio surround sound encoding processes to compress the multi-channel audio content or derivatives thereof. The compressed multi-channel audio content 29 may then be entropy encoded or coded in some other way to bandwidth compress the content 29 and arranged in accordance with an agreed upon (or, in other words, specified) format to form the bitstream 31. Whether directly compressed to form the bitstream 31 or rendered and then compressed to form the bitstream 31, the content creator 22 may transmit the bitstream 31 to the content consumer 24.

While shown in FIG. 3 as being directly transmitted to the content consumer 24, the content creator 22 may output the bitstream 31 to an intermediate device positioned between the content creator 22 and the content consumer 24. This intermediate device may store the bitstream 31 for later delivery to the content consumer 24, which may request this bitstream. The intermediate device may comprise a file server, a web server, a desktop computer, a laptop computer, a tablet computer, a mobile phone, a smart phone, or any other device capable of storing the bitstream 31 for later retrieval by an audio decoder. This intermediate device may reside in a content delivery network capable of streaming the bitstream 31 (and possibly in conjunction with transmitting a corresponding video data bitstream) to subscribers, such as the content consumer 24, requesting the bitstream 31.

Alternatively, the content creator 22 may store the bitstream 31 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 3.

As further shown in the example of FIG. 3, the content consumer 24 includes the audio playback system 32. The audio playback system 32 may represent any audio playback system capable of playing back multi-channel audio data. The audio playback system 32 may include a number of different renderers 34. The renderers 34 may each provide for a different form of rendering, where the different forms of rendering may include one or more of the various ways of performing vector-base amplitude panning (VBAP), and/or one or more of the various ways of performing sound field synthesis.

The audio playback system 32 may further include an extraction device 38. The extraction device 38 may represent any device capable of extracting spherical harmonic coefficients 27' ("SHC 27'," which may represent a modified form of or a duplicate of spherical harmonic coefficients 27) through a process that may generally be reciprocal to that of the bitstream generation device 36. In any event, the audio playback system 32 may receive the spherical harmonic coefficients 27' and may select one of the renderers 34. The selected one of the renderers 34 may then render the spherical harmonic coefficients 27' to generate a number of speaker feeds 35 (corresponding to the number of loudspeakers electrically or possibly wirelessly coupled to the audio playback system 32, which are not shown in the example of FIG. 3 for ease of illustration purposes).

Typically, when the bitstream generation device 36 directly encodes SHC 27, the bitstream generation device 36 encodes all of SHC 27. The number of SHC 27 sent for each representation of the sound field is dependent on the order and may be expressed mathematically as $(1+n)^2$/sample, where n again denotes the order. To achieve a fourth order representation of the sound field, as one example, 25 SHCs may be derived. Typically, each of the SHCs is expressed as a 32-bit signed floating point number. Thus, to express a fourth order representation of the sound field, a total of 25×32 or 800 bits/sample are required in this example. When a sampling rate of 48 kHz is used, this represents 800×48,000 or 38,400,000 bits/second. In some instances, one or more of the SHC 27 may not specify salient information (which may refer to information that contains audio information audible or important in describing the sound field when reproduced at the content consumer 24). Encoding these non-salient ones of the SHC 27 may result in inefficient use of bandwidth through the transmission channel (assuming a content delivery network type of transmission mechanism). In an application involving storage of these coefficients, the above may represent an inefficient use of storage space.

In some instances, when identifying subset of the SHC 27 that are included in the bitstream 31, the bitstream generation device 36 may specify a field having a plurality of bits with a different one of the plurality of bits identifying whether a corresponding one of the SHC 27 is included in the bitstream 31. In some instances, when identifying subset of the SHC 27 that are included in the bitstream 31, the bitstream generation device 36 may specify a field having a plurality of bits equal to $(n+1)^2$ bits, where n denotes an order of the hierarchical set of elements describing the sound field, and where each of the plurality of bits identify whether a corresponding one of the SHC 27 is included in the bitstream 31.

In some instances, the bitstream generation device 36 may, when identifying subset of the SHC 27 that are included in the bitstream 31, specify a field in the bitstream 31 having a plurality of bits with a different one of the plurality of bits identifying whether a corresponding one of the SHC 27 is included in the bitstream 31. When specifying the identified subset of the SHC 27, the bitstream generation device 36 may specify, in the bitstream 31, the identified subset of the SHC 27 directly after the field having the plurality of bits.

In some instances, the bitstream generation device 36 may additionally determine that one or more of the SHC 27 has information relevant in describing the sound field. When identifying the subset of the SHC 27 that are included in the bitstream 31, the bitstream generation device 36 may identify that the determined one or more of the SHC 27 having information relevant in describing the sound field are included in the bitstream 31.

In some instances, the bitstream generation device 36 may additionally determine that one or more of the SHC 27 have information relevant in describing the sound field. When identifying the subset of the SHC 27 that are included in the bitstream 31, the bitstream generation device 36 may identify, in the bitstream 31, that the determined one or more of the SHC 27 having information relevant in describing the sound field are included in the bitstream 31, and identify, in the bitstream 31, that remaining ones of the SHC 27 having information not relevant in describing the sound field are not included in the bitstream 31.

In some instances, the bitstream generation device 36 may determine that one or more of the SHC 27 values are below a threshold value. When identifying the subset of the SHC 27 that are included in the bitstream 31, the bitstream generation device 36 may identify, in the bitstream 31, that the determined one or more of the SHC 27 that are above this threshold value are specified in the bitstream 31. While the threshold may often be a value of zero, for practical implementations, the threshold may be set to a value representing a noise-floor (or ambient energy) or some value proportional to the current signal energy (which may make the threshold signal dependent).

In some instances, the bitstream generation device 36 may adjust or transform the sound field to reduce a number of the SHC 27 that provide information relevant in describing the sound field. The term "adjusting" may refer to application of any matrix or matrixes that represents a linear invertible transform. In these instances, the bitstream generation device 36 may specify adjustment information (which may also be referred to as "transformation information") in the bitstream 31 describing how the sound field was adjusted or, in other words, transformed. While described as specifying this information in addition to the information identifying the subset of the SHC 27 that are subsequently specified in the bitstream, this aspect of the techniques may be performed as an alternative to specifying information identifying the subset of the SHC 27 that are included in the bitstream. The techniques should therefore not be limited in this respect.

In some instances, the bitstream generation device 36 may rotate the sound field to reduce a number of the SHC 27 that provide information relevant in describing the sound field. In these instances, the bitstream generation device 36 may specify rotation information in the bitstream 31 describing how the sound field was rotated. Rotation information may comprise an azimuth value (capable of signaling 360 degrees) and an elevation value (capable of signaling 180 degrees). In some instances, the azimuth value comprises one or more bits, and typically includes 10 bits. In some instances, the elevation value comprises one or more bits and typically includes at least 9 bits. This choice of bits allows, in the simplest embodiment, a resolution of 180/512 degrees (in both elevation and azimuth). In some instances, the transformation may comprise the rotation and the transformation information described above includes the rotation information. In some instances, the bitstream generation device 36 may transform the sound field to reduce a number of the SHC 27 that provide information relevant in describing the sound field. In these instances, the bitstream generation device 36 may specify transformation information in the bitstream 31 describing how the sound field was transformed. In some instances, the adjustment may comprise the transformation and the adjustment information described above includes the transformation information.

In some instances, the bitstream generation device 36 may adjust the sound field to reduce a number of the SHC 27 having non-zero values above a threshold value and specify adjustment information in the bitstream 31 describing how the sound field was adjusted. In some instances, the bitstream generation device 36 may rotate the sound field to reduce a number of the SHC 27 having non-zero values above a threshold value, and specify rotation information in the bitstream 31 describing how the sound field was rotated. In some instances, the bitstream generation device 36 may transform the sound field to reduce a number of the SHC 27 having non-zero values above a threshold value, and specify transformation information in the bitstream 31 describing how the sound field was transformed.

By identifying in the bitstream 31 the subset of the SHC 27 that are included in the bitstream 31, the bitstream generation device 36 may promote more efficient usage of bandwidth in that the subset of the SHC 27 that do not include information relevant to the description of the sound field (such as zero valued ones of the SCH 27) are not specified in the bitstream, i.e., not included in the bitstream. Moreover, by additionally or alternatively, adjusting the sound field when generating the SHC 27 to reduce the number of SHC 27 that specify information relevant to the description of the sound field, the bitstream generation device 36 may again or additionally provide for potentially more efficient bandwidth usage. In this way, the bitstream generation device 31 may reduce the number of SHC 27 that are required to be specified in the bitstream 31, thereby potentially improving utilization of bandwidth in non-fix rate systems (which may refer to audio coding techniques that do not have a target bitrate or provide a bit-budget per frame or sample to provide a few examples) or, in fix rate system, potentially resulting in allocation of bits to information that is more relevant in describing the sound field.

Additionally or alternatively, the bitstream generation device 36 may operate in accordance with the techniques described in this disclosure to assign different bitrates to different subsets of the transformed spherical harmonic coefficients. By virtue of transforming, e.g., rotating, the sound field, the bitstream generation device 36 may align the most salient portions (often identified through analysis of energy at various spatial locations of the sound field) with an axis, such as the Z-axis, effectively setting the most high energy portions above the listener in the sound field. In other words, the bitstream generation device 36 may analyze the energy of the sound field to identify the portion of the sound field having the highest energy. If two or more portions of the sound field have high energy, the bitstream generation device 36 may compare these energies to identify the one having the highest energy. The bitstream generation device 36 may then identify one or more angles by which to rotate the sound field so as to align the highest energy portion of the sound field with the Z-axis.

This rotation or other transformation may be considered as a transformation of a frame of reference in which the spherical basis functions are set. Rather than maintain the Z-axis, such as those shown in the example of FIG. 2, as being straight up and down, this Z-axis may be transformed by one or more angles to point in the direction of the highest energy portion of the sound field. Those basis functions having some directional component, such as the spherical basis function of order one and sub-order zero that is aligned with the Z-axis, may then be rotated. The sound field may then be expressed using these transformed, e.g., rotated, spherical basis functions. The bitstream generation device 36 may rotate this frame of reference so that the Z-axis aligns with the highest energy portion of the sound field. This rotation may result in highest energy of the sound field being expressed primarily by those zero sub-order basis functions, while the non-zero sub-order basis functions may not contain as much salient information.

Once rotated in this manner, the bitstream generation device 36 may determine transformed spherical harmonic coefficients, which refers to spherical harmonic coefficients associated with the transformed spherical basis functions. Given that the zero sub-order spherical basis functions may primarily represent the sound field, the bitstream generation device 36 may assign a first bitrate for expressing these zero sub-order transformed spherical harmonic coefficients (which may refer to those transformed spherical harmonic coefficients corresponding to zero sub-order basis functions) in the bitstream 31, while assigning a second bitrate for expressing the non-zero sub-order transformed spherical harmonic coefficients (which may refer to those transformed spherical harmonic coefficients corresponding to non-zero sub-order basis functions) in the bitstream 31, where this first bitrate is greater than the second bitrate. In other words, because the zero sub-order transformed spherical harmonic coefficients describe the most salient portions of the sound field, the bitstream generation device 36 may assign a higher bitrate for expressing these transformed coefficients in the bitstream, while assigning a lower bitrate (relative to the higher bitrate) for expressing these coefficients in the bitstream.

When assigning these bitrates to what may be referred to as the first subset of the transformed spherical harmonic coefficients (e.g., the zero sub-order transformed spherical harmonic coefficients) and the second subset of the transformed spherical harmonic coefficients (e.g., the non-zero sub-order transformed spherical harmonic coefficients), the bitstream generation device 36 may utilize a windowing function, such as a Hanning windowing function, a Hamming windowing function, a rectangular windowing function, or a triangular windowing function. While described with respect to first and second subsets of the transformed spherical harmonic coefficients, the bitstream generation device 36 may identify a two, three, four and often up to 2*n+1 (where n refers to the order) subsets of the spherical harmonic coefficients. Typically, each sub-order for the order may represent another subset of the transformed spherical harmonic coefficients to which the bitstream generation device 36 assigns a different bitrate.

In this sense, the bitstream generation device 36 may dynamically assign different bitrates to different ones of the SHC 27 on a per order and/or sub-order basis. This dynamic allocation of bitrates may facilitate better use of the overall target bitrate, assigning higher bitrates to the ones of the transformed SHC 27 describing more salient portions of the sound field while assigning a lower bitrates (in comparison to the higher bitrates) to the ones of the transformed SHC 27 describing comparatively less salient portions (or, in other words, ambient or background portions) of the sound field.

To illustrate, consider once again the example of FIG. 2. The bitstream generation device 36 may, based on the windowing function, assign a bitrate to each sub-order of the transformed spherical harmonic coefficients, where for the fourth (4) order, the bitstream generation device 36 identifies nine (from minus four to positive four) different subsets of the transformed spherical harmonic coefficients. For example, the bitstream generation device 36 may, based on the windowing function, assign a first bitrate for expressing the 0 sub-order transformed spherical harmonic coefficients, a second bitrate for expressing the −1/+1 sub-order transformed spherical harmonic coefficients, a third bitrate for expressing the −2/+2 sub-order transformed spherical harmonic coefficients, a fourth bitrate for expressing the −3/+3 sub-order transformed spherical harmonic coefficients and a fifth bitrate for expressing the −4/+4 sub-order transformed spherical harmonic coefficients.

In some instances, the bitstream generation device 36 may assign bitrates in an even more granular manner, where the bitrate varies not just by sub-order but also by order. Given that the spherical basis functions of higher order have smaller lobes, these higher order spherical basis functions are not as important in representing high energy portions of the sound field. As a result, the bitstream generation device 36 may assign a lower bitrate to the higher order transformed spherical harmonic coefficients relative the this bitrate assigned to the lower order transformed spherical harmonic coefficients. Again, the bitstream generation device 36 may assign this order-specific bitrates based on a windowing function in a manner similar to that described above with respect to assignment of the sub-order-specific bitrates.

In this respect, the bitstream generation device 36 may assign a bitrate to at least one subset of transformed spherical harmonic coefficients based on one or more of an order and a sub-order of a spherical basis function to which the subset of the transformed spherical harmonic coefficients corresponds, the transformed spherical harmonic coefficients having been transformed in accordance with a transform operation that transforms a sound field.

In some instances, the transformation operation comprises a rotation operation that rotates the sound filed.

In some instances, the bitstream generation device 36 may identify one or more angles by which to rotate the sound field such that a portion of the sound field having the highest energy is aligned with an axis, where the transformation operation may comprise a rotation operation that rotates the sound field by the identified one or more angles so as to generate the transformed spherical harmonic coefficients.

In some instances, the bitstream generation device 36 may identify one or more angles by which to rotate the sound field such that a portion of the sound field having the highest energy is aligned with a Z-axis, where the transformation operation may comprise a rotation operation that rotates the sound field by the identified one or more angles so as to generate the transformed spherical harmonic coefficients.

In some instances, the bitstream generation device 36 may perform a spatial analysis with respect to the sound field to identify one or more angles by which to rotate the sound field, where the transformation operation may comprises a rotation operation that rotates the sound field by the identified one or more angles so as to generate the transformed spherical harmonic coefficients.

In some instances, the bitstream generation device 36 may, when assigning the bitrate, dynamically assign, in accordance with a windowing function, different bitrates to different subsets of the transformed spherical harmonic coefficients based on one or more of the order and the sub-order of the spherical basis function to which each of the transformed spherical harmonic coefficients corresponds. The windowing function may comprise one or more of a Hanning windowing function, a Hamming windowing function, a rectangular windowing function and a triangular windowing function.

In some instances, the bitstream generation device 36 may, when assigning the bitrate, assign a first bitrate to a first subset of the transformed spherical harmonic coefficients corresponding to the subset of the spherical basis functions having a sub-order of zero, and assign a second bitrate to a second subset of the transformed spherical harmonic coefficients corresponding to the subset of the spherical basis functions having a sub-order of either positive one or negative, the first bitrate being greater than the second bitrate. In this sense, the techniques may provide for dynamic assignment of bitrates based on the sub-order of the spherical basis functions to which the SHC 27 corresponds.

In some instances, the bitstream generation device 36 may, when assigning the bitrate, assign a first bitrate to a first subset of the transformed spherical harmonic coefficients corresponding to the subset of the spherical basis function having an order of one, and assign a second bitrate to a second subset of the transformed spherical harmonic coefficients corresponding to the subset of the spherical basis functions having an order of two, the first bitrate being greater than the second bitrate. In this way, the techniques may provide for dynamical assignment of bitrates based on the order of the spherical basis functions to which the SHC 27 correspond.

In some instances, the bitstream generation device 36 may generate a bitstream that specifies the first subset of the transformed spherical harmonic coefficients using the first bit-rate and the second subset of the transformed spherical harmonic coefficients using the second bit-rate.

In some instances, the bitstream generation device 36 may, when assigning the bitrate, dynamically assign progressively decreasing bitrates as the sub-order of the spherical basis functions to which the transformed spherical harmonic coefficients corresponds moves away from zero.

In some instances, the bitstream generation device 36 may, when assigning the bitrate, dynamically assign progressively decreasing bitrates as the order of the spherical basis functions to which the transformed spherical harmonic coefficients corresponds increases.

In some instances, the bitstream generation device 36 may, when assign the bitrate, dynamically assign different bitrates to different subsets of transformed spherical harmonic coefficients based on one or more of the order and the sub-order of the spherical basis function to which the subset of the transformed spherical harmonic coefficients corresponds.

Within the content consumer 24, the extraction device 38 may then perform a method of processing the bitstream 31 representative of audio content in accordance with aspects of the techniques reciprocal to those described above with respect to the bitstream generation device 36. The extraction device 38 may determine, from the bitstream 31, the subset of the SHC 27' describing a sound field that are included in the bitstream 31, and parse the bitstream 31 to determine the identified subset of the SHC 27'.

In some instances, the extraction device 38 may when, determining the subset of the SHC 27' that are included in the bitstream 31, the extraction device 38 may parse the bitstream 31 to determine a field having a plurality of bits with each one of the plurality of bits identifying whether a corresponding one of the SHC 27' is included in the bitstream 31.

In some instances, the extraction device 38 may when, determining the subset of the SHC 27' that are included in the bitstream 31, specify a field having a plurality of bits equal to $(n+1)^2$ bits, where again n denotes an order of the hierarchical set of elements describing the sound field. Again, each of the plurality of bits identify whether a corresponding one of the SHC 27' is included in the bitstream 31.

In some instances, the extraction device 38 may when, determining the subset of the SHC 27' that are included in the bitstream 31, parse the bitstream 31 to identify a field in the bitstream 31 having a plurality of bits with a different one of the plurality of bits identifying whether a corresponding one of the SHC 27' is included in the bitstream 31. The extraction device 38 may when, parsing the bitstream 31 to determine the identified subset of the SHC 27', parse the bitstream 31 to determine the identified subset of the SHC 27' directly from the bitstream 31 after the field having the plurality of bits.

In some instances, the extraction device 38 may parse the bitstream 31 to determine adjustment information describing how the sound field was adjusted to reduce a number of the SHC 27' that provide information relevant in describing the sound field. The extraction device 38 may provide this information to the audio playback system 32, which when reproducing the sound field based on the subset of the SHC 27' that provide information relevant in describing the sound field, adjusts the sound field based on the adjustment information to reverse the adjustment performed to reduce the number of the plurality of hierarchical elements.

In some instances, the extraction device 38 may, as an alternative to or in conjunction with the above described aspects of the techniques, parse the bitstream 31 to determine rotation information describing how the sound field was rotated to reduce a number of the SHC 27' that provide information relevant in describing the sound field. The extraction device 38 may provide this information to the audio playback system 32, which when reproducing the sound field based on the subset of the SHC 27' that provide information relevant in describing the sound field, rotates the sound field based on the rotation information to reverse the rotation performed to reduce the number of the plurality of hierarchical elements.

In some instances, the extraction device 38 may, as an alternative to or in conjunction with the above described aspects of the techniques, parse the bitstream 31 to determine transformation information describing how the sound field was transformed to reduce a number of the SHC 27' that provide information relevant in describing the sound field. The extraction device 38 may provide this information to the audio playback system 32, which when reproducing the sound field based on the subset of the SHC 27' that provide information relevant in describing the sound field, transforms the sound field based on the adjustment information to reverse the transformation performed to reduce the number of the plurality of hierarchical elements.

In some instances, the extraction device 38 may, as an alternative to or in conjunction with the above described aspects of the techniques, parse the bitstream 31 to determine adjustment information describing how the sound field was adjusted to reduce a number of the SHC 27' that have non-zero values. The extraction device 38 may provide this information to the audio playback system 32, which when reproducing the sound field based on the subset of the SHC 27' that have non-zero values, adjusts the sound field based on the adjustment information to reverse the adjustment performed to reduce the number of the plurality of hierarchical elements.

In some instances, the extraction device 38 may, as an alternative to or in conjunction with the above described aspects of the techniques, parse the bitstream 31 to determine rotation information describing how the sound field was rotated to reduce a number of the SHC 27' that have non-zero values. The extraction device 38 may provide this information to the audio playback system 32, which when reproducing the sound field based on the subset of the SHC 27' that have non-zero values, rotating the sound field based on the rotation information to reverse the rotation performed to reduce the number of the plurality of hierarchical elements.

In some instances, the extraction device 38 may, as an alternative to or in conjunction with the above described aspects of the techniques, parse the bitstream 31 to determine transformation information describing how the sound field was transformed to reduce a number of the SHC 27' that have non-zero values. The extraction device 38 may provide this information to the audio playback system 32, which when reproducing the sound field based on those of the SHC 27' that have non-zero values, transforms the sound field based on the transformation information to reverse the transformation performed to reduce the number of the plurality of hierarchical elements.

In this respect, various aspects of the techniques may enable signaling, in a bitstream, of those of a plurality of hierarchical elements, such as higher order ambisonics (HOA) coefficients (which may also be referred to as spherical harmonic coefficients), that are included in the bitstream (where those that are to be included in the bitstream may be referred to as a "subset of the plurality of the SHC"). Given that some of the HOA coefficients may not provide information relevant in describing a sound field, the audio encoder may reduce the plurality of HOA coefficients to a subset of the HOA coefficients that provide information relevant in describing the sound field, thereby increasing the coding efficiency. As a result, various aspects of the techniques may enable specifying in the bitstream that includes the HOA coefficients and/or encoded versions thereof, those of the HOA coefficients that are actually included in the bitstream (e.g., the non-zero subset of the HOA coefficients that includes at least one of the HOA coefficients but not all of the coefficients). The information identifying the subset of the HOA coefficients may be specified in the bitstream as noted above, or in some instances, in side channel information.

Figure 4A:
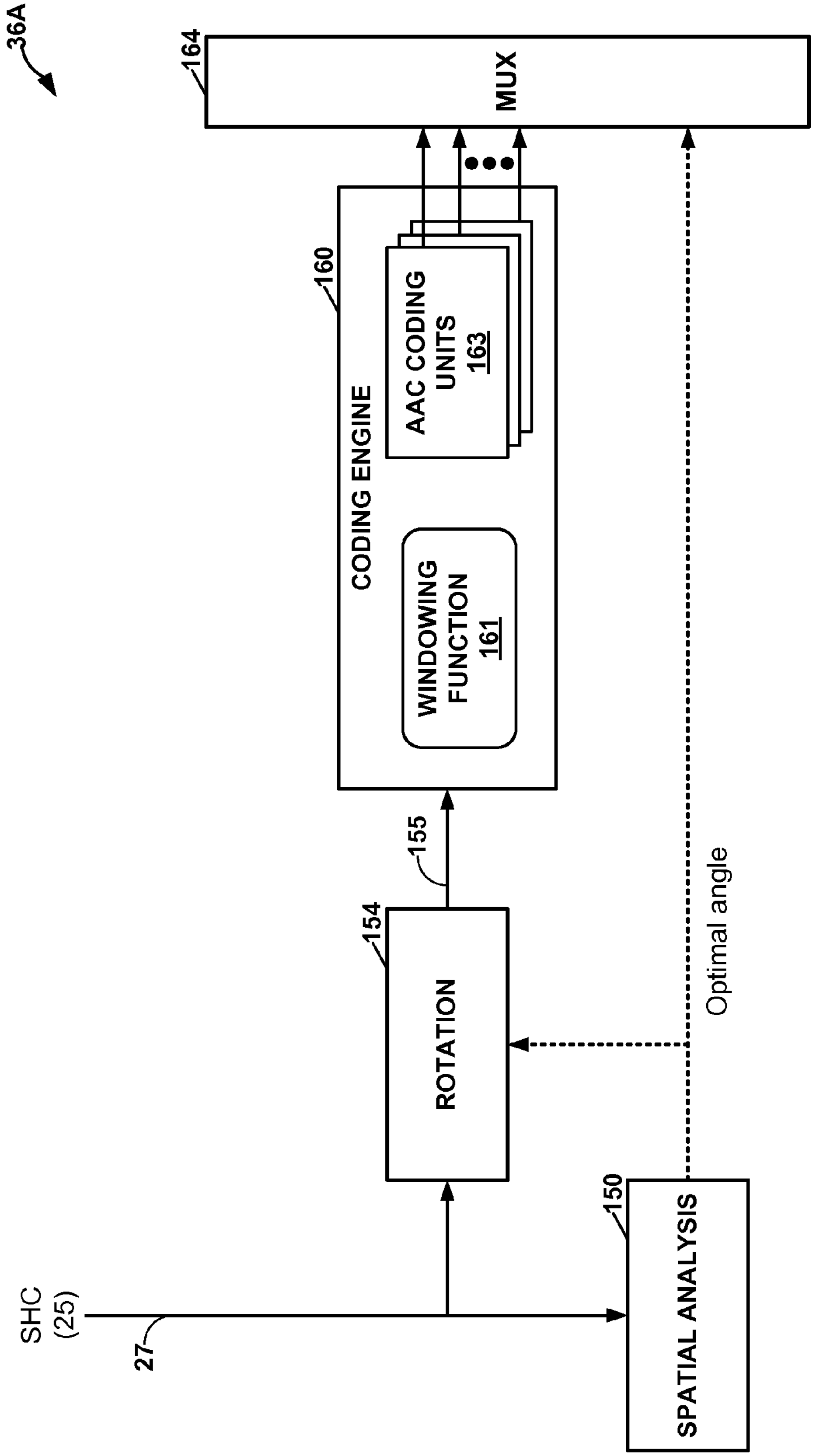
FIGS. 4A and 4B are block diagrams illustrating example implementations of the bitstream generation device shown in the example of FIG. 3.
Figure 4B:
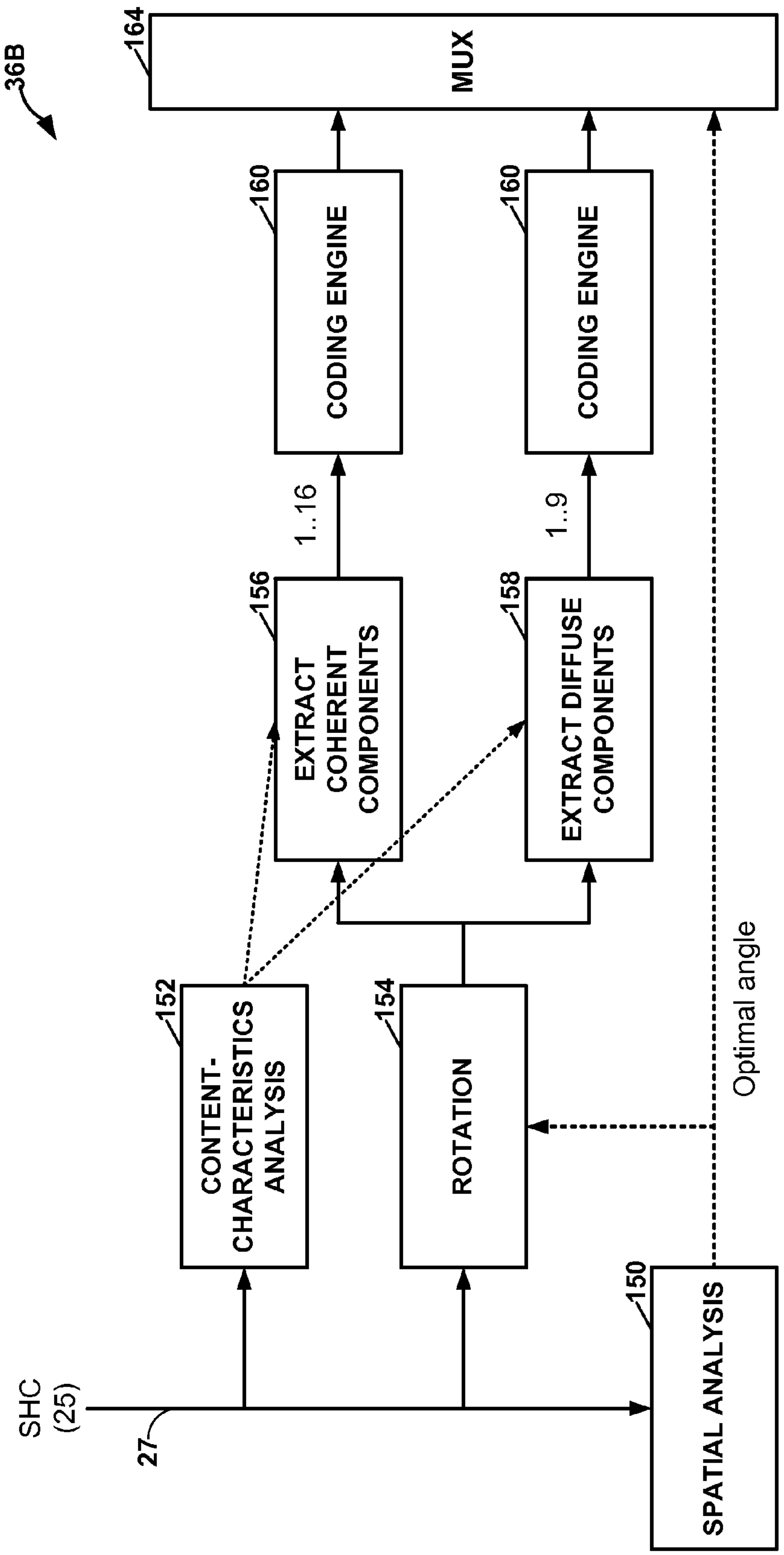

FIGS. 4A and 4B are block diagrams illustrating an example implementation of the bitstream generation device 36. As illustrated in the example of FIG. 4A, the first implementation of bitstream generation device 36, denoted as bitstream generation device 36A, includes a spatial analysis unit 150, a rotation unit 154, a coding engine 160, and a multiplexer (MUX) 164.

The bandwidth—in terms of bits/second—required to represent 3D audio data in the form of SHC may make it prohibitive in terms of consumer use. For example, when using a sampling rate of 48 kHz, and with 32 bits/same resolution—a fourth order SHC representation represents a bandwidth of 36 Mbits/second (25×48000×32 bps). When compared to the state-of-the-art audio coding for stereo signals, which is typically about 100 kbits/second, this is a large figure. Techniques implemented in the example of FIG. 5 may reduce the bandwidth of 3D audio representations.

The spatial analysis unit 150 and the rotation unit 154 may receive SHC 27. As described elsewhere in this disclosure, the SHC 27 may be representative of a sound field. In the example of FIG. 4A, the spatial analysis unit 150 and the rotation unit 154 may receive samples of twenty-five SHC for a fourth order (N=4) representation of the sound field. Typically, a frame of audio data includes 1028 samples, although the techniques may be performed with respect to a frame having any number of samples. The spatial analysis unit 150 and the rotation unit 154 may operate in the manner described below with respect to a frame of the audio data. While described as operating on a frame of audio data, the techniques may be performed with respect to any amount of audio data, including a single sample and up to the entirety of the audio data.

The spatial analysis unit 150 may analyze the sound field represented by the SHC 27 to identify distinct components of the sound field and diffuse components of the sound field. The distinct components of the sound field are sounds that are perceived to come from an identifiable direction or that are otherwise distinct from background or diffuse components of the sound field. For instance, the sound generated by an individual musical instrument may be perceived to come from an identifiable direction. In contrast, diffuse or background components of the sound field are not perceived to come from an identifiable direction. For instance, the sound of wind through a forest may be a diffuse component of a sound field. In some instances, the distinct components may also be referred to as "salient components" or "foreground components," while the diffuse components may be referred to as "ambient components" or "background components."

Typically, these distinct components have high energy in an identifiable location of the sound field. The spatial analysis unit 150 may identify these "high energy" locations of the sound field, analyzing each high energy location to determine a location in the sound field having the highest energy. The spatial analysis unit 150 may then determine an optimal angle by which to rotate the sound field to align those of the distinct components having the most energy with an axis (relative to a presumed microphone that recorded this sound field), such as the Z-axis. The spatial analysis unit 150 may identify this optimal angle so that the sound field may be rotated such that these distinct components better align with the underlying spherical basis functions shown in the examples of FIGS. 1 and 2.

In some examples, the spatial analysis unit 150 may represent a unit configured to perform a form of diffusion analysis to identify a percentage of the sound field represented by the SHC 27 that includes diffuse sounds (which may refer to sounds having low levels of direction or lower order SHC, meaning those of SHC 27 having an order less than or equal to one). As one example, the spatial analysis unit 150 may perform diffusion analysis in a manner similar to that described in a paper by Ville Pulkki, entitled "Spatial Sound Reproduction with Directional Audio Coding," published in the J. Audio Eng. Soc., Vol. 55, No. 6, dated June 2007. In some instances, the spatial analysis unit 150 may only analyze a non-zero subset of the SHC 27 coefficients, such as the zero and first order ones of the SHC 27, when performing the diffusion analysis to determine the diffusion percentage.

The rotation unit 154 may perform a rotation operation of the SHC 27 based on the identified optimal angle (or angles as the case may be). As discussed elsewhere in this disclosure (e.g., with respect to FIGS. 5A and 5B), performing the rotation operation may reduce the number of bits required to represent the SHC 27. The rotation unit 154 may output transformed spherical harmonic coefficients 155 ("transformed SHC 155") to the coding engine 160.

The coding engine 160 may represent a unit configured to bandwidth compress the transformed SHC 155. The coding engine 160 may assign different bitrates to different subsets of the transformed SHC 155 in accordance with the techniques described in this disclosure. As shown in the example of FIG. 4A, the coding engine 160 includes a windowing function 161 and AAC coding units 163. The coding engine 160 may apply the windowing function 161 to a target bitrate in order to assign bitrates to one or more of AAC coding units 163. The windowing functions 161 may identify different bitrates for each order and/or sub-order of the spherical basis functions to which the transformed SHC 155 correspond. The coding engine 160 may then configure the AAC coding unit 163 with the identified bitrates, whereupon the coding engine 160 may divide the transformed SHC 155 into different subsets and pass these different subsets to a corresponding one of the AAC coding units 163. That is, if a bitrate is configured in one of the AAC coding units 163 for those of the transformed SHC 155 corresponding to zero-sub-order spherical basis functions, the coding engine 160 passes those of the transformed SHC 127 corresponding to the zero-sub-order spherical basis functions to the one off the AAC coding units 163. The AAC coding units 163 may then perform AAC with respect to the subsets of the transformed SHC 155, outputting compressed versions of the different subset of the transformed SHC 155 to the multiplexer 164. The multiplexer 164 may then multiplex these subsets together with the optimal angle to generate the bitstream 31.

As illustrated in the example of FIG. 4B, the bitstream generation device 36B includes a spatial analysis unit 150, a content-characteristics analysis unit 152, a rotation unit 154, an extract coherent components unit 156, an extract diffuse components unit 158, coding engines 160 and a multiplexer (MUX) 164. Although similar to the bitstream generation device 36A, the bitstream generation device 36B includes additional units 152, 156 and 158.

The content-characteristics analysis unit 152 may determine, based at least in part on the SHC 27, whether the SHC 27 were generated via a natural recording of a sound field or produced artificially (i.e., synthetically) from, as one example, an audio object, such as a PCM object. Furthermore, the content-characteristics analysis unit 152 may then determine, based at least in part on whether SHC 27 were generated via an actual recording of a sound field or from an artificial audio object, the total number of channels to include in the bitstream 31. For example, the content-characteristics analysis unit 152 may determine, based at least in part on whether the SHC 27 were generated from a recording of an actual sound field or from an artificial audio object, that the bitstream 31 is to include sixteen channels. Each of the channels may be a mono channel. The content-characteristics analysis unit 152 may further perform the determination of the total number of channels to include in the bitstream 31 based on an output bitrate of the bitstream 31, e.g., 1.2 Mbps.

In addition, the content-characteristics analysis unit 152 may determine, based at least in part on whether the SHC 27 were generated from a recording of an actual sound field or from an artificial audio object, how many of the channels to allocate to coherent or, in other words, distinct components of the sound field and how many of the channels to allocate to diffuse or, in other words, background components of the sound field. For example, when the SHC 27 were generated from a recording of an actual sound field using, as one example, an Eigenmic, the content-characteristics analysis unit 152 may allocate three of the channels to coherent components of the sound field and may allocate the remaining channels to diffuse components of the sound field. In this example, when the SHC 27 were generated from an artificial audio object, the content-characteristics analysis unit 152 may allocate five of the channels to coherent components of the sound field and may allocate the remaining channels to diffuse components of the sound field. In this way, the content analysis block (i.e., content-characteristics analysis unit 152) may determine the type of sound field (e.g., diffuse/directional, etc.) and in turn determine the number of coherent/diffuse components to extract.

The target bit rate may influence the number of components and the bitrate of the individual AAC coding engines (e.g., coding engines 160). In other words, the content-characteristics analysis unit 152 may further perform the determination of how many channels to allocate to coherent components and how many channels to allocate to diffuse components based on an output bitrate of the bitstream 31, e.g., 1.2 Mbps.

In some examples, the channels allocated to coherent components of the sound field may have greater bit rates than the channels allocated to diffuse components of the sound field. For example, a maximum bitrate of the bitstream 31 may be 1.2 Mb/sec. In this example, there may be four channels allocated to coherent components and 16 channels allocated to diffuse components. Furthermore, in this example, each of the channels allocated to the coherent components may have a maximum bitrate of 64 kb/sec. In this example, each of the channels allocated to the diffuse components may have a maximum bitrate of 48 kb/sec.

As indicated above, the content-characteristics analysis unit 152 may determine whether the SHC 27 were generated from a recording of an actual sound field or from an artificial audio object. The content-characteristics analysis unit 152 may make this determination in various ways. For example, the bitstream generation device 36 may use $4^{th}$ order SHC. In this example, the content-characteristics analysis unit 152 may code 24 channels and predict a $25^{th}$ channel (which may be represented as a vector). The content-characteristics analysis unit 152 may apply scalars to at least some of the 24 channels and add the resulting values to determine the $25^{th}$ vector. Furthermore, in this example, the content-characteristics analysis unit 152 may determine an accuracy of the predicted $25^{th}$ channel. In this example, if the accuracy of the predicted $25^{th}$ channel is relatively high (e.g., the accuracy exceeds a particular threshold), the SHC 27 is likely to be generated from a synthetic audio object. In contrast, if the accuracy of the predicted $25^{th}$ channel is relatively low (e.g., the accuracy is below the particular threshold), the SHC 27 is more likely to represent a recorded sound field. For instance, in this example, if a signal-to-noise ratio (SNR) of the $25^{th}$ channel is over 100 decibels (dbs), the SHC 27 are more likely to represent a sound field generated from a synthetic audio object. In contrast, the SNR of a sound field recorded using an Eigenmike may be 5 to 20 dbs. Thus, there may be an apparent demarcation in SNR ratios between sound field represented by the SHC 27 generated from an actual direct recording and from a synthetic audio object.

Furthermore, the content-characteristics analysis unit 152 may select, based at least in part on whether the SHC 27 were generated from a recording of an actual sound field or from an artificial audio object, codebooks for quantizing the V vector. In other words, the content-characteristics analysis unit 152 may select different codebooks for use in quantizing the V vector, depending on whether the sound field represented by the HOA coefficients is recorded or synthetic.

In some examples, the content-characteristics analysis unit 152 may determine, on a recurring basis, whether the SHC 27 were generated from a recording of an actual sound field or from an artificial audio object. In some such examples, the recurring basis may be every frame. In other examples, the content-characteristics analysis unit 152 may perform this determination once. Furthermore, the content-characteristics analysis unit 152 may determine, on a recurring basis, the total number of channels and the allocation of coherent component channels and diffuse component channels. In some such examples, the recurring basis may be every frame. In other examples, the content-characteristics analysis unit 152 may perform this determination once. In some examples, the content-characteristics analysis unit 152 may select, on a recurring basis, codebooks for use in quantizing the V vector. In some such examples, the recurring basis may be every frame. In other examples, the content-characteristics analysis unit 152 may perform this determination once.

The rotation unit 154 may perform a rotation operation of the HOA coefficients. As discussed elsewhere in this disclosure (e.g., with respect to FIGS. 5A and 5B), performing the rotation operation may reduce the number of bits required to represent the SHC 27. In some examples, the rotation analysis performed by the rotation unit 152 is an instance of a singular value decomposition (SVD) analysis. Principal component analysis (PCA), independent component analysis (ICA), and Karhunen-Loeve Transform (KLT) are related techniques that may be applicable.

In this respect, the techniques may provide for a method of generating a bitstream comprised of a plurality of hierarchical elements that describe a sound field, where, in a first example, the method comprises transforming the plurality of hierarchical elements representative of a sound field from a spherical harmonics domain to another domain so as to reduce a number of the plurality of hierarchical elements, and specifying transformation information in the bitstream describing how the sound field was transformed.

In a second example, the method of the first example, wherein transforming the plurality of hierarchical elements comprises performing a vector-based transformation with respect to the plurality of hierarchical elements.

In a third example, the method of the second example, wherein performing the vector-based transformation comprises performing one or more of a singular value decomposition (SVD), a principal component analysis (PCA), and a Karhunen-Loeve transform (KLT) with respect to the plurality of hierarchical elements.

In a fourth example, a device comprises one or more processors configured to transform a plurality of hierarchical elements representative of a sound field from a spherical harmonics domain to another domain so as to reduce a number of the plurality of hierarchical elements, and specify transformation information in a bitstream describing how the sound field was transformed.

In a fifth example, the device of the fourth example, wherein the one or more processors are configured to, when transforming the plurality of hierarchical elements, perform a vector-based transformation with respect to the plurality of hierarchical elements.

In a sixth example, the device of the fifth example, wherein the one or more processors are configured to, when performing the vector-based transformation, perform one or more of a singular value decomposition (SVD), a principal component analysis (PCA), and a Karhunen-Loeve transform (KLT) with respect to the plurality of hierarchical elements.

In a seventh example, a device comprises means for transforming a plurality of hierarchical elements representative of a sound field from a spherical harmonics domain to another domain so as to reduce a number of the plurality of hierarchical elements, and means for specifying transformation information in a bitstream describing how the sound field was transformed.

In an eighth example, the device of the seventh example, wherein the means for transforming the plurality of hierarchical elements comprises means for performing a vector-based transformation with respect to the plurality of hierarchical elements.

In a ninth example, the device of the eighth example, wherein the means for performing the vector-based transformation comprises means for performing one or more of a singular value decomposition (SVD), a principal component analysis (PCA), and a Karhunen-Loeve transform (KLT) with respect to the plurality of hierarchical elements.

In a tenth example, a non-transitory computer-readable storage medium has stored thereon instructions that, when executed, cause one or more processors to transform a plurality of hierarchical elements representative of a sound field from a spherical harmonics domain to another domain so as to reduce a number of the plurality of hierarchical elements, and specify transformation information in a bitstream describing how the sound field was transformed.

In an eleventh example, a method comprises parsing a bitstream to determine translation information describing how a plurality of hierarchical elements that describe a sound field were transformed from a spherical harmonics domain to another domain to reduce a number of the plurality of hierarchical elements, and reconstructing, when reproducing the sound field based the plurality of hierarchical elements, the plurality of hierarchical elements based on the transformed plurality of hierarchical elements.

In a twelfth example, the method of the eleventh example, wherein the transformation information describes how the plurality of hierarchical elements were transformed using vector-based decomposition to reduce the number of the plurality of hierarchical elements, and wherein transforming the sound field comprises, when reproducing the sound field based on the plurality of hierarchical elements, reconstructing the plurality of hierarchical elements based on the vector-based decomposed plurality of hierarchical elements.

In a thirteenth example, the method of the twelfth example, wherein the vector-based decomposition comprises one or more of a singular value decomposition (SVD), a principal component analysis (PCA), and a Karhunen-Loeve transform (KLT).

In an fourteenth example, a device comprises one or more processors configured to parse a bitstream to determine translation information describing how a plurality of hierarchical elements that describe a sound field were transformed from a spherical harmonics domain to another domain to reduce a number of the plurality of hierarchical elements, and reconstruct, when reproducing the sound field based the plurality of hierarchical elements, the plurality of hierarchical elements based on the transformed plurality of hierarchical elements.

In a fifteenth example, the device of the fourteenth example, wherein the transformation information describes how the plurality of hierarchical elements were transformed using vector-based decomposition to reduce the number of the plurality of hierarchical elements, and wherein the one or more processors are configured to, when transforming the sound field, reconstruct, when reproducing the sound field based on the plurality of hierarchical elements, reconstructing the plurality of hierarchical elements based on the vector-based decomposed plurality of hierarchical elements.

In a sixteenth example, the device of the fifteenth example, wherein the vector-based decomposition comprises one or more of a singular value decomposition (SVD), a principal component analysis (PCA), and a Karhunen-Loeve transform (KLT).

In an seventeenth example, a device comprises means for parsing a bitstream to determine translation information describing how a plurality of hierarchical elements that describe a sound field were transformed from a spherical harmonics domain to another domain to reduce a number of the plurality of hierarchical elements, and means for reconstructing, when reproducing the sound field based the plurality of hierarchical elements, the plurality of hierarchical elements based on the transformed plurality of hierarchical elements.

In an eighteenth example, the device of the seventeenth example, wherein the transformation information describes how the plurality of hierarchical elements were transformed using vector-based decomposition to reduce the number of the plurality of hierarchical elements, and wherein the means for transforming the sound field comprises means for reconstructing, when reproducing the sound field based on the plurality of hierarchical elements, the plurality of hierarchical elements based on the vector-based decomposed plurality of hierarchical elements.

In a nineteenth example, the device of the eighteenth example, wherein the vector-based decomposition comprises one or more of a singular value decomposition (SVD), a principal component analysis (PCA), and a Karhunen-Loeve transform (KLT).

In a twentieth example, a non-transitory computer-readable storage medium having stored thereon instructions that, when executed, cause one or more processors to parse a bitstream to determine translation information describing how a plurality of hierarchical elements that describe a sound field were transformed from a spherical harmonics domain to another domain to reduce a number of the plurality of hierarchical elements, and reconstruct, when reproducing the sound field based the plurality of hierarchical elements, the plurality of hierarchical elements based on the transformed plurality of hierarchical elements.

In the example of FIG. 4B, the extract coherent components unit 156 receives rotated SHC 27 from rotation unit 154. Furthermore, the extract coherent components unit 156 extracts, from the rotated SHC 27, those of the rotated SHC 27 associated with the coherent components of the sound field.

In addition, the extract coherent components unit 156 generates one or more coherent component channels. Each of the coherent component channels may include a different subset of the rotated SHC 27 associated with the coherent coefficients of the sound field. In the example of FIG. 4B, the extract coherent components unit 156 may generate from one to 16 coherent component channels. The number of coherent component channels generated by the extract coherent components unit 156 may be determined by the number of channels allocated by the content-characteristics analysis unit 152 to the coherent components of the sound field. The bitrates of the coherent component channels generated by the extract coherent components unit 156 may be the determined by the content-characteristics analysis unit 152.

Similarly, in the example of FIG. 4B, extract diffuse components unit 158 receives rotated SHC 27 from rotation unit 154. Furthermore, the extract diffuse components unit 158 extracts, from the rotated SHC 27, those of the rotated SHC 27 associated with diffuse components of the sound field.

In addition, the extract diffuse components unit 158 generates one or more diffuse component channels. Each of the diffuse component channels may include a different subset of the rotated SHC 27 associated with the diffuse coefficients of the sound field. In the example of FIG. 4B, the extract diffuse components unit 158 may generate from one to 9 diffuse component channels. The number of diffuse component channels generated by the extract diffuse components unit 158 may be determined by the number of channels allocated by the content-characteristics analysis unit 152 to the diffuse components of the sound field. The bitrates of the diffuse component channels generated by the extract diffuse components unit 158 may be the determined by the content-characteristics analysis unit 152.

In the example of FIG. 4B, coding engine 160 may operate as described above with respect to the example of FIG. 4A, only this time with respect to the diffuse and coherent components. The multiplexer 164 ("MUX 164") may multiplex the encoded coherent component channels and the encoded diffuse component channels, along with side data (e.g., an optimal angle determined by spatial analysis unit 150), to generate the bitstream 31.

Figure 5B:
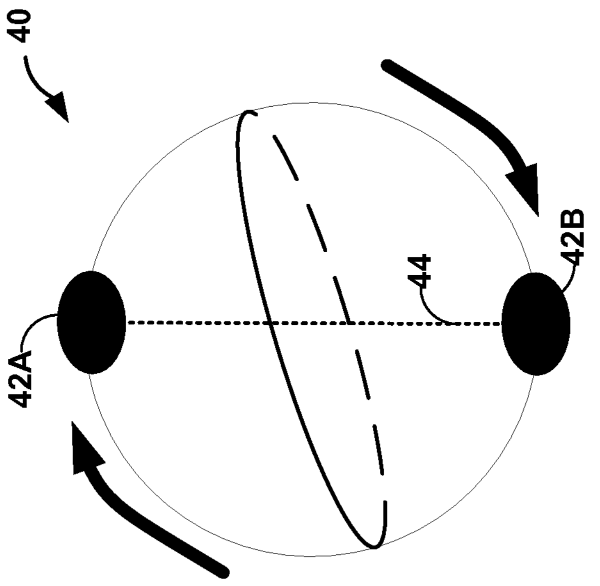
FIGS. 5A and 5B are diagrams illustrating an example of performing various aspects of the techniques described in this disclosure to rotate a sound field.
Figure 5A:
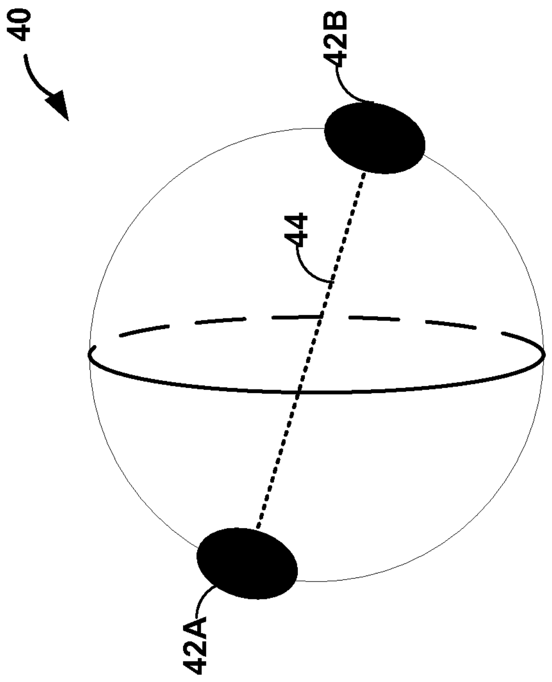

FIGS. 5A and 5B are diagrams illustrating an example of performing various aspects of the techniques described in this disclosure to rotate a sound field 40. FIG. 5A is a diagram illustrating sound field 40 prior to rotation in accordance with the various aspects of the techniques described in this disclosure. In the example of FIG. 5A, the sound field 40 includes two locations of high pressure, denoted as location 42A and 42B. These locations 42A and 42B ("locations 42") reside along a line 44 that has a non-infinite slope (which is another way of referring to a line that is not vertical, as vertical lines have an infinite slope). Given that the locations 42 have a z coordinate in addition to x and y coordinates, higher-order spherical basis functions may be required to correctly represent this sound field 40 (as these higher-order spherical basis functions describe the upper and lower or non-horizontal portions of the sound field). Rather than reduce the sound field 40 directly to SHCs 27, the bitstream generation device 36 may rotate the sound field 40 until the line 44 connecting the locations 42 is vertical.

FIG. 5B is a diagram illustrating the sound field 40 after being rotated until the line 44 connecting the locations 42 is vertical. As a result of rotating the sound field 40 in this manner, the SHC 27 may be derived such that non-zero sub-order ones of SHC 27 are specified as zeros given that the rotated sound field 40 no longer has any locations of pressure (or energy) along non-vertical axis (e.g., the X-axis and/or Y-axis). In this way, the bitstream generation device 36 may rotate, transform or more generally adjust the sound field 40 to reduce the number of the rotated SHC 27 having non-zero values. The bitstream generation device 36 may then allocate lower bitrates to non-zero sub-order ones of the rotated SHC 27 relative to zero sub-order ones of the rotated SHC 27, as described above. The bitstream generation device 36 may also specify rotation information in the bitstream 31 indicating how the sound field 40 was rotated, often by way of expressing an azimuth and elevation in the manner described above.

Alternatively or additionally, the bitstream generation device 36 may then, rather than signal a 32-bit signed number identifying that these higher order ones of SHC 27 have zero values, signal in a field of the bitstream 31 that these higher order ones of SHC 27 are not signaled. The extraction device 38 may, in these instances, imply that these non-signaled ones of the rotated SHC 27 have a zero value and, when reproducing the sound field 40 based on SHC 27, perform the rotation to rotate the sound field 40 so that the sound field 40 resembles sound field 40 shown in the example of FIG. 5A. In this way, the bitstream generation device 36 may reduce the number of SHC 27 required to be specified in the bitstream 31 or otherwise reduce the bitrate associated with non-zero sub-order ones of the rotated SHC 27.

A 'spatial compaction' algorithm may be used to determine the optimal rotation of the soundfield. In one embodiment, bitstream generation device 36 may perform the algorithm to iterate through all of the possible azimuth and elevation combinations (i.e., 1024×512 combinations in the above example), rotating the sound field for each combination, and calculating the number of SHC 27 that are above the threshold value. The azimuth/elevation candidate combination which produces the least number of SHC 27 above the threshold value may be considered to be what may be referred to as the "optimum rotation." In this rotated form, the sound field may require the least number of SHC 27 for representing the sound field and can may then be considered compacted. In some instances, the adjustment may comprise this optimal rotation and the adjustment information described above may include this rotation (which may be termed "optimal rotation") information (in terms of the azimuth and elevation angles).

In some instances, rather than only specify the azimuth angle and the elevation angle, the bitstream generation device 36 may specify additional angles in the form, as one example, of Euler angles. Euler angles specify the angle of rotation about the Z-axis, the former X-axis and the former Z-axis. While described in this disclosure with respect to combinations of azimuth and elevation angles, the techniques of this disclosure should not be limited to specifying only the azimuth and elevation angles, but may include specifying any number of angles, including the three Euler angles noted above. In this sense, the bitstream generation device 36 may rotate the sound field to reduce a number of the plurality of hierarchical elements that provide information relevant in describing the sound field and specify Euler angles as rotation information in the bitstream. The Euler angles, as noted above, may describe how the sound field was rotated. When using Euler angles, the bitstream extraction device 38 may parse the bitstream to determine rotation information that includes the Euler angles and, when reproducing the sound field based on those of the plurality of hierarchical elements that provide information relevant in describing the sound field, rotating the sound field based on the Euler angles.

Moreover, in some instances, rather than explicitly specify these angles in the bitstream 31, the bitstream generation device 36 may specify an index (which may be referred to as a "rotation index") associated with pre-defined combinations of the one or more angles specifying the rotation. In other words, the rotation information may, in some instances, include the rotation index. In these instances, a given value of the rotation index, such as a value of zero, may indicate that no rotation was performed. This rotation index may be used in relation to a rotation table. That is, the bitstream generation device 36 may include a rotation table comprising an entry for each of the combinations of the azimuth angle and the elevation angle.

Alternatively, the rotation table may include an entry for each matrix transforms representative of each combination of the azimuth angle and the elevation angle. That is, the bitstream generation device 36 may store a rotation table having an entry for each matrix transformation for rotating the sound field by each of the combinations of azimuth and elevation angles. Typically, the bitstream generation device 36 receives SHC 27 and derives SHC 27', when rotation is performed, according to the following equation:

$$\begin{bmatrix} SHC \\ 27' \end{bmatrix} = \begin{bmatrix} EncMat_2 \\ (25\times 32) \end{bmatrix} \begin{bmatrix} InvMat_1 \\ (32\times 25) \end{bmatrix} \begin{bmatrix} SHC \\ 27 \end{bmatrix}$$

In the equation above, SHC 27' are computed as a function of an encoding matrix for encoding a sound field in terms of a second frame of reference ($EncMat_2$), an inversion matrix for reverting SHC 27 back to a sound field in terms of a first frame of reference ($InvMat_1$), and SHC 27. $EncMat_2$ is of size 25×32, while $InvMat_2$ is of size 32×25. Both of SHC 27' and SHC 27 are of size 25, where SHC 27' may be further reduced due to removal of those that do not specify salient audio information. $EncMat_2$ may vary for each azimuth and elevation angle combination, while $InvMat_1$ may remain static with respect to each azimuth and elevation angle combination. The rotation table may include an entry storing the result of multiplying each different $EncMat_2$ to $InvMat_1$.

Figure 6:
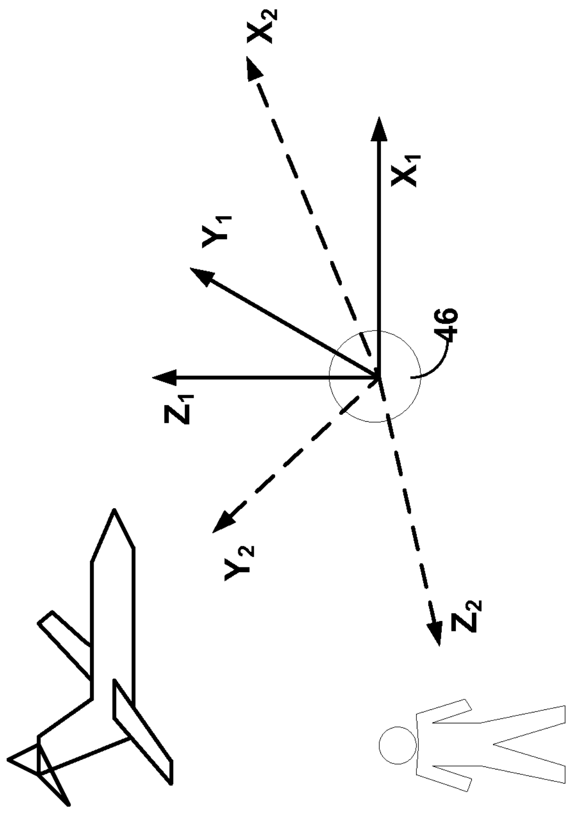
FIG. 6 is a diagram illustrating an example sound field captured according to a first frame of reference that is then rotated in accordance with the techniques described in this disclosure to express the sound field in terms of a second frame of reference.

FIG. 6 is a diagram illustrating an example sound field captured according to a first frame of reference that is then rotated in accordance with the techniques described in this disclosure to express the sound field in terms of a second frame of reference. In the example of FIG. 6, the sound field surrounding an Eigen-microphone 46 is captured assuming a first frame of reference, which is denoted by the $X_1$, $Y_1$, and $Z_1$ axes in the example of FIG. 6. SHC 27 describe the sound field in terms of this first frame of reference. The $InvMat_1$ transforms SHC 27 back to the sound field, enabling the sound field to be rotated to the second frame of reference denoted by the $X_2$, $Y_2$, and $Z_2$ axes in the example of FIG. 6. The $EncMat_2$ described above may rotate the sound field and generate SHC 27' describing this rotated sound field in terms of the second frame of reference.

In any event, the above equation may be derived as follows. Given that the sound field is recorded with a certain coordinate system, such that the front is considered the direction of the X-axis, the 32 microphone positions of an Eigenmike (or other microphone configurations) are defined from this reference coordinate system. Rotation of the sound field may then be considered as a rotation of this frame of reference. For the assumed frame of reference, SHC 27 may be calculated as follows:

$$\begin{bmatrix} SHC \\ 27 \end{bmatrix} \begin{bmatrix} Y_0^0(Pos_1) & Y_0^0(Pos_2) & \dots & Y_0^0(Pos_{32}) \\ Y_1^{-1}(Pos_1) & \dots & & Y_1^{-1}(Pos_{32}) \\ \vdots & \ddots & & \\ Y_4^4(Pos_1) & & & Y_4^4(Pos_{32}) \end{bmatrix} \begin{bmatrix} mic_1(t) \\ mic_2(t) \\ \vdots \\ mic_{32}(t) \end{bmatrix}$$

In the above equation, the $Y_n^m$ represent the spherical basis functions at the position ($Pos_i$) of the $i^{th}$ microphone (where i may be 1-32 in this example). The $mic_i$ vector denotes the microphone signal for the $i^{th}$ microphone for a time t. The positions ($Pos_i$) refer to the position of the microphone in the first frame of reference (i.e., the frame of reference prior to rotation in this example).

The above equation may be expressed alternatively in terms of the mathematical expressions denoted above as:

$$[SHC\_27]=[E_s(\theta,\phi)][m_i(t)].$$

To rotate the sound field (or in the second frame of reference), the position ($Pos_i$) would be calculated in the second frame of reference. As long as the original microphone signals are present, the sound field may be arbitrarily rotated. However, the original microphone signals ($mic_i(t)$) are often not available. The problem then may be how to retrieve the microphone signals ($mic_i(t)$) from SHC 27. If a T-design is used (as in a 32 microphone Eigenmike), the solution to this problem may be achieved by solving the following equation:

$$\begin{bmatrix} mic_1(t) \\ mic_2(t) \\ \vdots \\ mic_{32}(t) \end{bmatrix} = [InvMat_1] \begin{bmatrix} SHC \\ 27 \end{bmatrix}$$

This $InvMat_1$ may specify the spherical harmonic basis functions computed according to the position of the microphones as specified relative to the first frame of reference. This equation may also be expressed as $[m_i(t)]=[E_s(\theta, \phi)]^{-1}[SHC]$, as noted above.

Although referred to as "microphone signals" above, the microphone signals may refer to a spatial domain representation using the 32 microphone capsule position t-design rather than "microphone signals" per se. Moreover, while described with respect to 32 microphone capsule positions, the techniques may be performed with respect to any number of microphone capsule positions, including 16, 64 or any other number (including those that are not a factor of two).

Once the microphone signals ($mic_i(t)$) are retrieved in accordance with the equation above, the microphone signals ($mic_i(t)$) describing the sound field may be rotated to compute SHC 27' corresponding to the second frame of reference, resulting in the following equation:

$$\begin{bmatrix} SHC \\ 27' \end{bmatrix} = \begin{bmatrix} EncMat_2 \\ (25\times 32) \end{bmatrix} \begin{bmatrix} InvMat_1 \\ (32\times 25) \end{bmatrix} \begin{bmatrix} SHC \\ 27 \end{bmatrix}$$

The $EncMat_2$ specifies the spherical harmonic basis functions from a rotated position ($Pos_i'$). In this way, the $EncMat_2$ may effectively specify a combination of the azimuth and elevation angle. Thus, when the rotation table stores the result of $$\begin{bmatrix} EncMat_2 \\ (25\times 32) \end{bmatrix} \begin{bmatrix} InvMat_1 \\ (32\times 25) \end{bmatrix}$$

for each combination of the azimuth and elevation angles, the rotation table effectively specifies each combination of the azimuth and elevation angles. The above equation may also be expressed as:

$$[\text{SHC } 27'] = [E_s(\theta_2,\phi_2)][E_s(\theta_1,\phi_1)]^{-1}[\text{SHC } 27],$$

where $\theta_2$, $\phi_2$ represent a second azimuth angle and a second elevation angle different form the first azimuth angle and elevation angle represented by $\theta_1$, $\phi_1$. The $\theta_1$, $\phi_1$ correspond to the first frame of reference while the $\theta_2$, $\phi_2$ correspond to the second frame of reference. The $InvMat_1$ may therefore correspond to $[E_s(\theta_1, \phi_1)]^{-1}$, while the $EncMat_2$ may correspond to $[E_s(\theta_2, \phi_2)]$.

The above may represent a more simplified version of the computation that does not consider the filtering operation, represented above in various equations denoting the derivation of SHC 27 in the frequency domain by the $j_n(\bullet)$ function, which refers to the spherical Bessel function of order n. In the time domain, this $j_n(\bullet)$ function represents a filtering operation that is specific to a particular order, n. With filtering, rotation may be performed per order. To illustrate, consider the following equations:

$$a_n^k(t) \square b_n(t) * \langle [Y_n^m] \square [m_i(t)] \rangle$$

$$a_n^k(t) \square \langle [Y_n^m] \square b_n(t) * [m_i(t)] \rangle$$

While described with respect to such filtering operations, in various examples, the techniques may be performed without these filtering operations. In other words, various forms of rotation may be performed without performing or otherwise applying the filtering operations to the SHC 27, as noted above. Because different 'n' SHC do not interact with one another in this operation, no filters may be required given that the filters are only dependent on 'n' and not 'm.' For example, a Winger d-Matrix may be applied to the SHC 27 to perform the rotation, where application of this Winger d-Matrix may not require the application of the filtering operations. As a result of not transforming the SHC 27 back to microphone signals, the filtering operations may be required in this transform. Moreover, considering that 'n' only goes into 'n,' the rotation is done on blocks of 2m+1 of the SHC 27 and the rest may be zeros. For more efficient memory allocation (possibly in software), the rotation may be done per order as described in this disclosure. Furthermore, because there is only one SHC 27 at n=0, it is always the same. Various implementations of the techniques may make use of this single one of SHC 27 at n=0 to provide for efficiency (in terms of computations and/or memory consumption).

From these equations, the rotated SHC 27' for orders are done separately since the $b_n(t)$ are different for each order. As a result, the above equation may be altered as follows for computing the first order ones of the rotated SHC 27':

$$\begin{bmatrix} 1^{st} \\ \text{Order} \\ SHC \\ 27' \end{bmatrix} = \begin{bmatrix} EncMat_2 \\ (3\times 32) \end{bmatrix} \begin{bmatrix} InvMat_1 \\ (32\times 3) \end{bmatrix} \begin{bmatrix} 1^{st} \\ \text{Order} \\ SHC \\ 27 \end{bmatrix}$$

Given that there are three first order ones of SHC 27, each of the SHC 27' and 27 vectors are of size three in the above equation. Likewise, for the second order, the following equation may be applied:

$$\begin{bmatrix} 2^{nd} \\ \text{Order} \\ SHC \\ 27' \end{bmatrix} = \begin{bmatrix} EncMat_2 \\ (5\times 32) \end{bmatrix} \begin{bmatrix} InvMat_1 \\ (32\times 5) \end{bmatrix} \begin{bmatrix} 2^{nd} \\ \text{Order} \\ SHC \\ 27 \end{bmatrix}$$

Again, given that there are five second order ones of SHC 27, each of the SHC 27' and 27 vectors are of size five in the above equation. The remaining equations for the other orders, i.e., the third and fourth orders, may be similar to that described above, following the same pattern with regard to the sizes of the matrixes (in that the number of rows of $EncMat_2$, the number of columns of $InvMat_1$ and the sizes of the third and fourth order SHC 27 and SHC 27' vectors is equal to the number of sub-orders (m times two plus 1) of each of the third and fourth order spherical harmonic basis functions. Although described as being a fourth order representation, the techniques may be applied to any order and should not be limited to the fourth order.

The bitstream generation device 36 may therefore perform this rotation operation with respect to every combination of azimuth and elevation angle in an attempt to identify the so-called optimal rotation. The bitstream generation device 36 may, after performing this rotation operation, compute the number of SHC 27' above the threshold value. In some instances, the bitstream generation device 36 may perform this rotation to derive a series of SHC 27' that represent the sound field over a duration of time, such as an audio frame. By performing this rotation to derive the series of the SHC 27' that represent the sound field over this time duration, the bitstream generation device 36 may reduce the number of rotation operations that have to be performed in comparison for doing this for each set of the SHC 27 describing the sound field for time durations less than a frame or other length. In any event, the bitstream generation device 36 may save, throughout this process, those of SHC 27' having the least number of the SHC 27' greater than the threshold value.

However, performing this rotation operation with respect to every combination of azimuth and elevation angle may be processor intensive or time-consuming. As a result, the bitstream generation device 36 may not perform what may be characterized as this "brute force" implementation of the rotation algorithm. Instead, the bitstream generation device 36 may perform rotations with respect to a subset of possibly known (statistically-wise) combinations of azimuth and elevation angle that offer generally good compaction, performing further rotations with regard to combinations around those of this subset providing better compaction compared to other combinations in the subset.

As another alternative, the bitstream generation device 36 may perform this rotation with respect to only the known subset of combinations. As another alternative, the bitstream generation device 36 may follow a trajectory (spatially) of combinations, performing the rotations with respect to this trajectory of combinations. As another alternative, the bitstream generation device 36 may specify a compaction threshold that defines a maximum number of SHC 27' having non-zero values above the threshold value. This compaction threshold may effectively set a stopping point to the search, such that, when the bitstream generation device 36 performs a rotation and determines that the number of SHC 27' having a value above the set threshold is less than or equal to (or less than in some instances) than the compaction threshold, the bitstream generation device 36 stops performing any additional rotation operations with respect to remaining combinations. As yet another alternative, the bitstream generation device 36 may traverse a hierarchically arranged tree (or other data structure) of combinations, performing the rotation operations with respect to the current combination and traversing the tree to the right or left (e.g., for binary trees) depending on the number of SHC 27' having a non-zero value greater than the threshold value.

In this sense, each of these alternatives involve performing a first and second rotation operation and comparing the result of performing the first and second rotation operation to identify one of the first and second rotation operations that results in the least number of the SHC 27' having a non-zero value greater than the threshold value. Accordingly, the bitstream generation device 36 may perform a first rotation operation on the sound field to rotate the sound field in accordance with a first azimuth angle and a first elevation angle and determine a first number of the plurality of hierarchical elements representative of the sound field rotated in accordance with the first azimuth angle and the first elevation angle that provide information relevant in describing the sound field. The bitstream generation device 36 may also perform a second rotation operation on the sound field to rotate the sound field in accordance with a second azimuth angle and a second elevation angle and determine a second number of the plurality of hierarchical elements representative of the sound field rotated in accordance with the second azimuth angle and the second elevation angle that provide information relevant in describing the sound field. Furthermore, the bitstream generation device 36 may select the first rotation operation or the second rotation operation based on a comparison of the first number of the plurality of hierarchical elements and the second number of the plurality of hierarchical elements.

In some instances, the rotation algorithm may be performed with respect to a duration of time, where subsequent invocations of the rotation algorithm may perform rotation operations based on past invocations of the rotation algorithm. In other words, the rotation algorithm may be adaptive based on past rotation information determined when rotating the sound field for a previous duration of time. For example, the bitstream generation device 36 may rotate the sound field for a first duration of time, e.g., an audio frame, to identify SHC 27' for this first duration of time. The bitstream generation device 36 may specify the rotation information and the SHC 27' in the bitstream 31 in any of the ways described above. This rotation information may be referred to as first rotation information in that it describes the rotation of the sound field for the first duration of time. The bitstream generation device 31 may then, based on this first rotation information, rotate the sound field for a second duration of time, e.g., a second audio frame, to identify SHC 27' for this second duration of time. The bitstream generation device 36 may utilize this first rotation information when performing the second rotation operation over the second duration of time to initialize a search for the "optimal" combination of azimuth and elevation angles, as one example. The bitstream generation device 36 may then specify the SHC 27' and corresponding rotation information for the second duration of time (which may be referred to as "second rotation information") in the bitstream 31.

While described above with respect to a number of different ways by which to implement the rotation algorithm to reduce processing time and/or consumption, the techniques may be performed with respect to any algorithm that may reduce or otherwise speed the identification of what may be referred to as the "optimal rotation." Moreover, the techniques may be performed with respect to any algorithm that identifying non-optimal rotations but that may improve performance in other aspects, often measured in terms of speed or processor or other resource utilization.

Figure 7A:
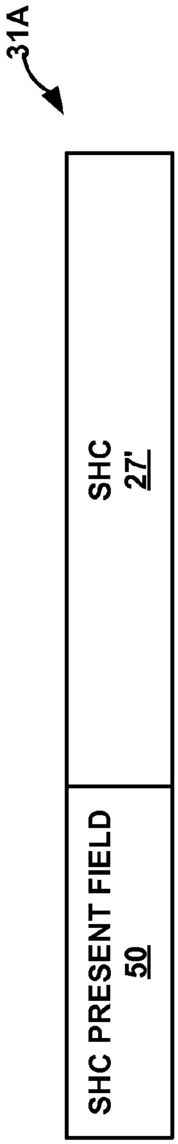
FIGS. 7A-7E illustrate examples of a bitstream formed in accordance with the techniques described in this disclosure.

FIGS. 7A-7E are each a diagram illustrating bitstreams 31A-31E formed in accordance with the techniques described in this disclosure. In the example of FIG. 7A, the bitstream 31A may represent one example of the bitstream 31 shown in FIG. 3 above. The bitstream 31A includes an SHC present field 50 and a field that stores SHC 27' (where the field is denoted "SHC 27'"). The SHC present field 50 may include a bit corresponding to each of SHC 27. The SHC 27' may represent those of SHC 27 that are specified in the bitstream, which may be less in number than the number of the SHC 27. Typically, each of SHC 27' are those of SHC 27 having non-zero values. As noted above, for a fourth-order representation of any given sound field, $(1+4)^2$ or 25 SHC are required. Eliminating one or more of these SHC and replacing these zero valued SHC with a single bit may save 31 bits, which may be allocated to expressing other portions of the sound field in more detail or otherwise removed to facilitate efficient bandwidth utilization.

Figure 7B:
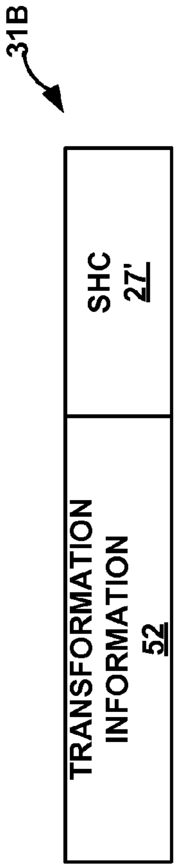

In the example of FIG. 7B, the bitstream 31B may represent one example of the bitstream 31 shown in FIG. 3 above. The bitstream 31B includes an transformation information field 52 ("transformation information 52") and a field that stores SHC 27' (where the field is denoted "SHC 27'"). The transformation information 52, as noted above, may comprise transformation information, rotation information, and/or any other form of information denoting an adjustment to a sound field. In some instances, the transformation information 52 may also specify a highest order of SHC 27 that are specified in the bitstream 31B as SHC 27'. That is, the transformation information 52 may indicate an order of three, which the extraction device 38 may understand as indicating that SHC 27' includes those of SHC 27 up to and including those of SHC 27 having an order of three. Extraction device 38 may then be configured to set SHC 27 having an order of four or higher to zero, thereby potentially removing the explicit signaling of SHC 27 of order four or higher in the bitstream.

Figure 7C:
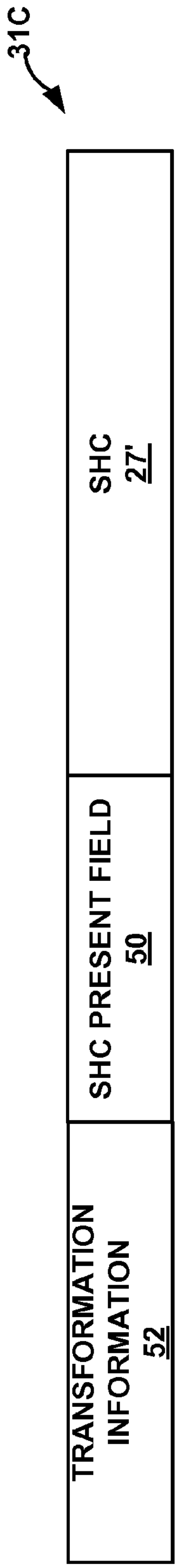

In the example of FIG. 7C, the bitstream 31C may represent one example of the bitstream 31 shown in FIG. 3 above. The bitstream 31C includes the transformation information field 52 ("transformation information 52"), the SHC present field 50 and a field that stores SHC 27' (where the field is denoted "SHC 27'"). Rather than be configured to understand which order of SHC 27 are not signaled as described above with respect to FIG. 7B, the SHC present field 50 may explicitly signal which of the SHC 27 are specified in the bitstream 31C as SHC 27'.

Figure 7D:
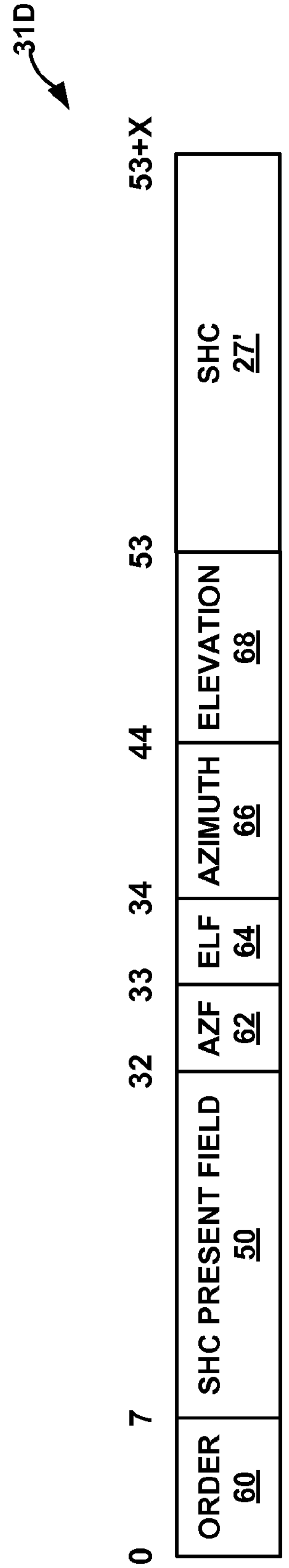

In the example of FIG. 7D, the bitstream 31D may represent one example of the bitstream 31 shown in FIG. 3 above. The bitstream 31D includes an order field 60 ("order 60"), the SHC present field 50, an azimuth flag 62 ("AZF 62"), an elevation flag 64 ("ELF 64"), an azimuth angle field 66 ("azimuth 66"), an elevation angle field 68 ("elevation 68") and a field that stores SHC 27' (where, again, the field is denoted "SHC 27'"). The order field 60 specifies the order of SHC 27', i.e., the order denoted by n above for the highest order of the spherical basis function used to represent the sound field. The order field 60 is shown as being an 8-bit field, but may be of other various bit sizes, such as three (which is the number of bits required to specify the forth order). The SHC present field 50 is shown as a 25-bit field. Again, however, the SHC present field 50 may be of other various bit sizes. The SHC present field 50 is shown as 25 bits to indicate that the SHC present field 50 may include one bit for each of the spherical harmonic coefficients corresponding to a fourth order representation of the sound field.

The azimuth flag 62 represents a one-bit flag that specifies whether the azimuth field 66 is present in the bitstream 31D. When the azimuth flag 62 is set to one, the azimuth field 66 for SHC 27' is present in the bitstream 31D. When the azimuth flag 62 is set to zero, the azimuth field 66 for SHC 27' is not present or otherwise specified in the bitstream 31D. Likewise, the elevation flag 64 represents a one-bit flag that specifies whether the elevation field 68 is present in the bitstream 31D. When the elevation flag 64 is set to one, the elevation field 68 for SHC 27' is present in the bitstream 31D. When the elevation flag 64 is set to zero, the elevation field 68 for SHC 27' is not present or otherwise specified in the bitstream 31D. While described as one signaling that the corresponding field is present and zero signaling that the corresponding field is not present, the convention may be reversed such that a zero specifies that the corresponding field is specified in the bitstream 31D and a one specifies that the corresponding field is not specified in the bitstream 31D. The techniques described in this disclosure should therefore not be limited in this respect.

The azimuth field 66 represents a 10-bit field that specifies, when present in the bitstream 31D, the azimuth angle. While shown as a 10-bit field, the azimuth field 66 may be of other bit sizes. The elevation field 68 represents a 9-bit field that specifies, when present in the bitstream 31D, the elevation angle. The azimuth angle and the elevation angle specified in fields 66 and 68, respectively, may in conjunction with the flags 62 and 64 represent the rotation information described above. This rotation information may be used to rotate the sound field so as to recover SHC 27 in the original frame of reference.

The SHC 27' field is shown as a variable field that is of size X. The SHC 27' field may vary due to the number of SHC 27' specified in the bitstream as denoted by the SHC present field 50. The size X may be derived as a function of the number of ones in SHC present field 50 times 32-bits (which is the size of each SHC 27').

Figure 7E:
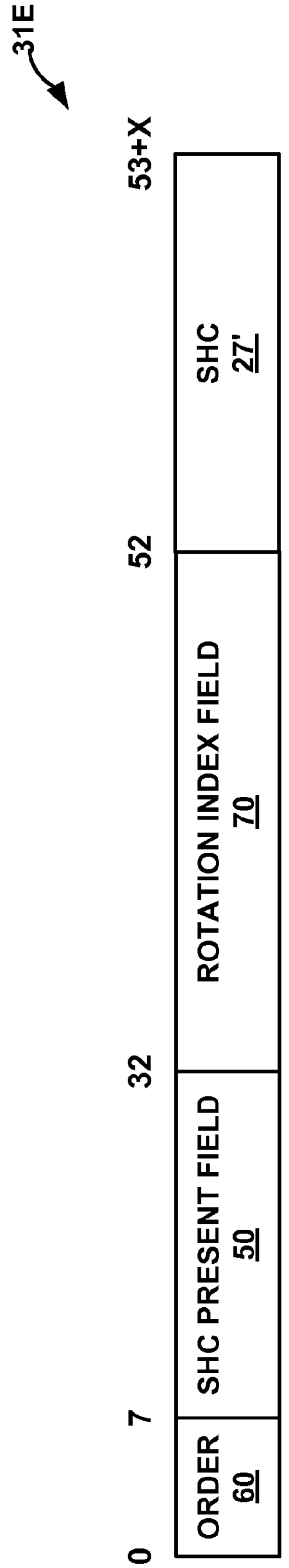

In the example of FIG. 7E, the bitstream 31E may represent another example of the bitstream 31 shown in FIG. 3 above. The bitstream 31E includes an order field 60 ("order 60"), an SHC present field 50, and a rotation index field 70, and a field that stores SHC 27' (where, again, the field is denoted "SHC 27'"). The order field 60, the SHC present field 50 and the SHC 27' field may be substantially similar to those described above. The rotation index field 70 may represent a 20-bit field used to specify one of the 1024×512 (or, in other words, 524288) combinations of the elevation and azimuth angles. In some instances, only 19-bits may be used to specify this rotation index field 70, and the bitstream generation device 36 may specify an additional flag in the bitstream to indicate whether a rotation operation was performed (and, therefore, whether the rotation index field 70 is present in the bitstream). This rotation index field 70 specifies the rotation index noted above, which may refer to an entry in a rotation table common to both the bitstream generation device 36 and the bitstream extraction device 38. This rotation table may, in some instances, store the different combinations of the azimuth and elevation angles. Alternatively, the rotation table may store the matrix described above, which effectively stores the different combinations of the azimuth and elevation angles in matrix form.

Figure 8:
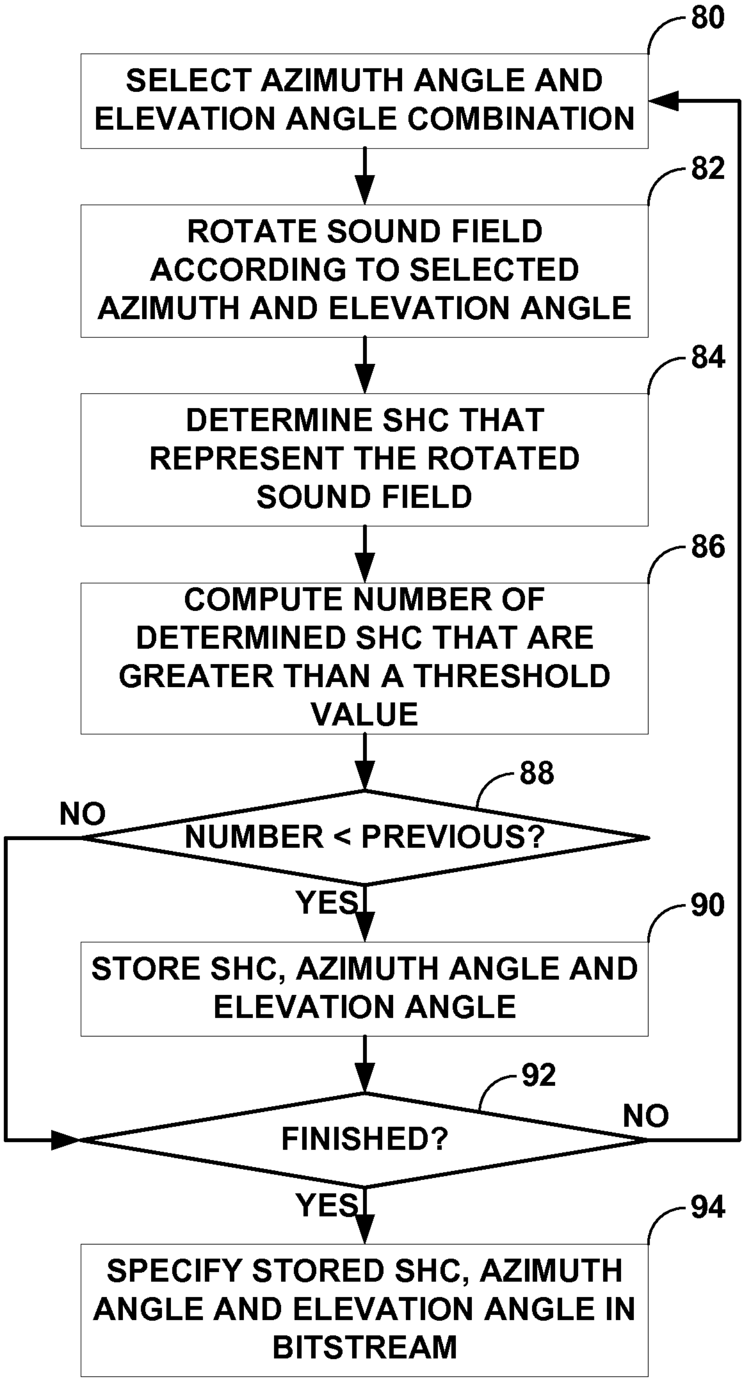
FIG. 8 is a flowchart illustrating example operation of the bitstream generation device of FIG. 3 in performing the rotation aspects of the techniques described in this disclosure.

FIG. 8 is a flowchart illustrating example operation of the bitstream generation device 36 shown in the example of FIG. 3 in implementing the rotation aspects of the techniques described in this disclosure. Initially, the bitstream generation device 36 may select an azimuth angle and elevation angle combination in accordance with one or more of the various rotation algorithms described above (80). The bitstream generation device 36 may then rotate the sound field according to the selected azimuth and elevation angle (82). As described above, the bitstream generation device 36 may first derive the sound field from SHC 27 using the $InvMat_1$ noted above. The bitstream generation device 36 may also determine SHC 27' that represent the rotated sound field (84). While described as being separate steps or operations, the bitstream generation device 36 may apply a transform (which may represent the result of $[EncMat_2][InvMat_1]$) that represents the selection of the azimuth angle and the elevation angle combination, deriving the sound field from the SHC 27, rotating the sound field and determining the SHC 27' that represent the rotated sound field.

In any event, the bitstream generation device 36 may then compute a number of the determined SHC 27' that are greater than a threshold value, comparing this number to a number computed for a previous iteration with respect to a previous azimuth angle and elevation angle combination (86, 88). In the first iteration with respect to the first azimuth angle and elevation angle combination, this comparison may be to a predefined previous number (which may set to zero). In any event, if the determined number of the SHC 27' is less than the previous number ("YES" 88), the bitstream generation device 36 stores the SHC 27', the azimuth angle and the elevation angle, often replacing the previous SHC 27', azimuth angle and elevation angle stored from a previous iteration of the rotation algorithm (90).

If the determined number of the SHC 27' is not less than the previous number ("NO" 88) or after storing the SHC 27', azimuth angle and elevation angle in place of the previously stored SHC 27', azimuth angle and elevation angle, the bitstream generation device 36 may determine whether the rotation algorithm has finished (92). That is, the bitstream generation device 36 may, as one example, determine whether all available combination of azimuth angle and elevation angle have been evaluated. In other examples, the bitstream generation device 36 may determine whether other criteria are met (such as that all of a defined subset of combination have been performed, whether a given trajectory has been traversed, whether a hierarchical tree has been traversed to a leaf node, etc.) such that the bitstream generation device 36 has finished performing the rotation algorithm. If not finished ("NO" 92), the bitstream generation device 36 may perform the above process with respect to another selected combination (80-92). If finished ("YES" 92), the bitstream generation device 36 may specify the stored SHC 27', azimuth angle and elevation angle in the bitstream 31 in one of the various ways described above (94).

Figure 9:
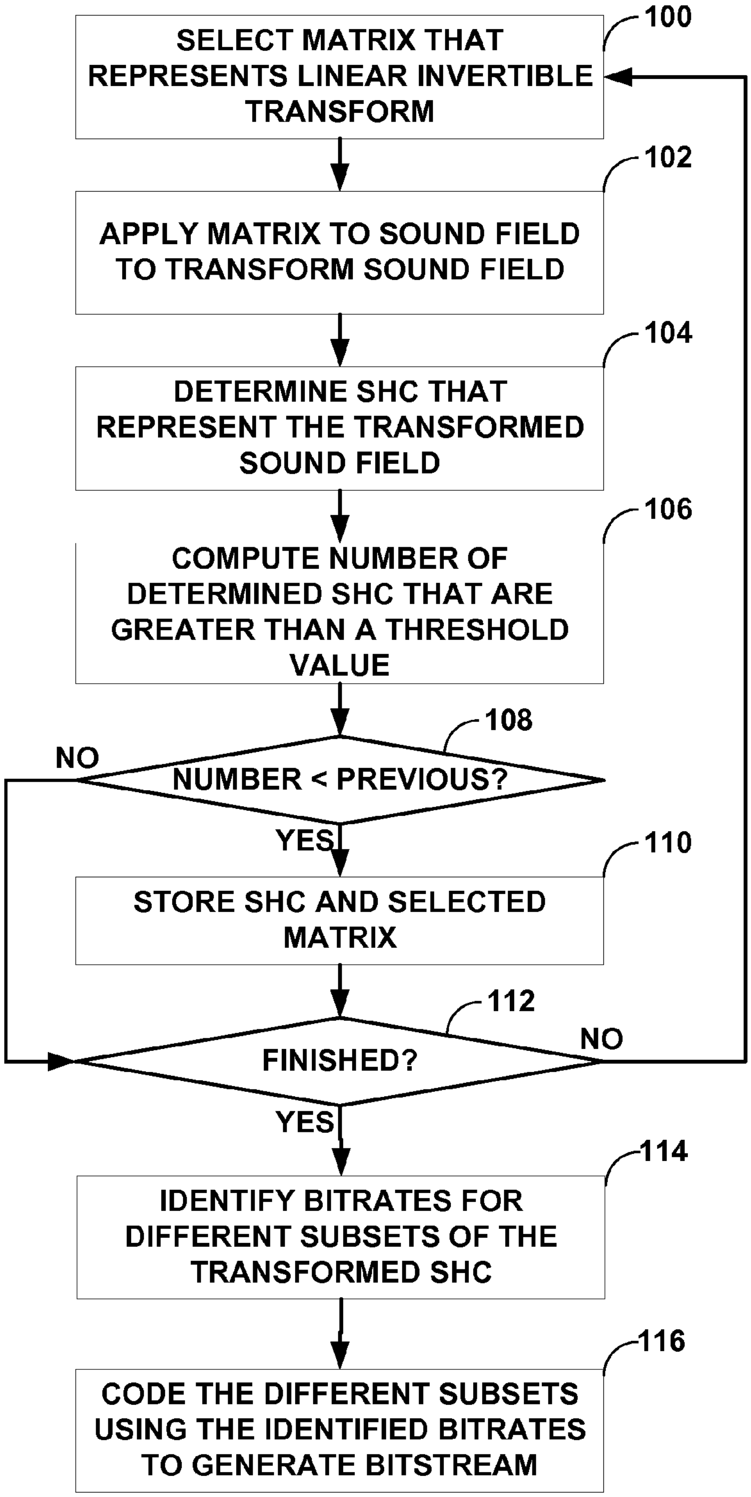
FIG. 9 is a flowchart illustrating example operation of the bitstream generation device shown in the example of FIG. 3 in performing the transformation aspects of the techniques described in this disclosure.

FIG. 9 is a flowchart illustrating example operation of the bitstream generation device 36 shown in the example of FIG. 4 in performing the transformation aspects of the techniques described in this disclosure. Initially, the bitstream generation device 36 may select a matrix that represents a linear invertible transform (100). One example of a matrix that represents a linear invertible transform may be the above shown matrix that is the result of [$EncMat_1$][$IncMat_1$]. The bitstream generation device 36 may then apply the matrix to the sound field to transform the sound field (102). The bitstream generation device 36 may also determine SHC 27' that represent the rotated sound field (104). While described as being separate steps or operations, the bitstream generation device 36 may apply a transform (which may represent the result of [$EncMat_2$][$InvMat_1$]), deriving the sound field from the SHC 27, transform the sound field and determining the SHC 27' that represent the transform sound field.

In any event, the bitstream generation device 36 may then compute a number of the determined SHC 27' that are greater than a threshold value, comparing this number to a number computed for a previous iteration with respect to a previous application of a transform matrix (106, 108). If the determined number of the SHC 27' is less than the previous number ("YES" 108), the bitstream generation device 36 stores the SHC 27' and the matrix (or some derivative thereof, such as an index associated with the matrix), often replacing the previous SHC 27' and matrix (or derivative thereof) stored from a previous iteration of the rotation algorithm (110).

If the determined number of the SHC 27' is not less than the previous number ("NO" 108) or after storing the SHC 27' and matrix in place of the previously stored SHC 27' and matrix, the bitstream generation device 36 may determine whether the transform algorithm has finished (112). That is, the bitstream generation device 36 may, as one example, determine whether all available transform matrixes have been evaluated. In other examples, the bitstream generation device 36 may determine whether other criteria are met (such as that all of a defined subset of the available transform matrixes have been performed, whether a given trajectory has been traversed, whether a hierarchical tree has been traversed to a leaf node, etc.) such that the bitstream generation device 36 has finished performing the transform algorithm. If not finished ("NO" 112), the bitstream generation device 36 may perform the above process with respect to another selected transform matrix (100-112). If finished ("YES" 112), the bitstream generation device 36 may then, as noted above, identify different bitrates for the different transformed subsets of the SHC 27' (114). The bitstream generation device 36 may then code the different subsets using the identified bitrates to generate the bitstream 31 (116).

In some examples, the transform algorithm may perform a single iteration, evaluating a single transform matrix. That is, the transform matrix may comprise any matrix that represents a linear invertible transform. In some instances, the linear invertible transform may transform the sound field from the spatial domain to the frequency domain. Examples of such a linear invertible transform may include a discrete Fourier transform (DFT). Application of the DFT may only involve a single iteration and therefore would not necessarily include steps to determine whether the transform algorithm is finished. Accordingly, the techniques should not be limited to the example of FIG. 9.

In other words, one example of a linear invertible transform is a discrete Fourier transform (DFT). The twenty-five SHC 27' could be operated on by the DFT to form a set of twenty-five complex coefficients. The bitstream generation device 36 may also zero-pad The twenty five SHCs 27' to be an integer multiple of 2, so as to potentially increase the resolution of the bin size of the DFT, and potentially have a more efficient implementation of the DFT, e.g. through applying a fast Fourier transform (FFT). In some instances, increasing the resolution of the DFT beyond 25 points is not necessarily required. In the transform domain, the bitstream generation device 36 may apply a threshold to determine whether there is any spectral energy in a particular bin. The bitstream generation device 36, in this context, may then discard or zero-out spectral coefficient energy that is below this threshold, and the bitstream generation device 36 may apply an inverse transform to recover SHC 27' having one or more of the SHC 27' discarded or zeroed-out. That is, after the inverse transform is applied, the coefficients below the threshold are not present, and as a result, less bits may be used to encode the sound field.

Another linear invertible transform may comprise a matrix that performs what is referred to as "singular value decomposition." While described with respect to SVD, the techniques may be performed with respect to any similar transformation or decomposition that provides for sets of linearly uncorrelated data. Also, reference to "sets" or "subsets" in this disclosure is generally intended to refer to "non-zero" sets or subsets unless specifically stated to the contrary and is not intended to refer to the classical mathematical definition of sets that includes the so-called "empty set."

Alternative transformations may include a principal component analysis, which is often abbreviated by the initialism PCA. PCA refers to a mathematical procedure that employs an orthogonal transformation to convert a set of observations of possibly correlated variables into a set of linearly uncorrelated variables referred to as principal components. Linearly uncorrelated variables represent variables that do not have a linear statistical relationship (or dependence) to one another. These principal components may be described as having a small degree of statistical correlation to one another. In any event, the number of so-called principal components is less than or equal to the number of original variables. Typically, the transformation is defined in such a way that the first principal component has the largest possible variance (or, in other words, accounts for as much of the variability in the data as possible), and each succeeding component in turn has the highest variance possible under the constraint that this successive component be orthogonal to (which may be restated as uncorrelated with) the preceding components. PCA may perform a form of order-reduction, which in terms of the SHC may result in the compression of the SHC. Depending on the context, PCA may be referred to by a number of different names, such as discrete Karhunen-Loeve transform, the Hotelling transform, proper orthogonal decomposition (POD), and eigenvalue decomposition (EVD) to name a few examples.

In any event, SVD represents a process that is applied to the SHC to transform the SHC into two or more sets of transformed spherical harmonic coefficients. The bitstream generation device 36 may perform SVD with respect to the SHC 27 to generate a so-called V matrix, an S matrix and a U matrix. SVD, in linear algebra, may represent a factorization of a m-by-n real or complex matrix X (where X may represent multi-channel audio data, such as the SHC 11A) in the following form:

$$X=USV^*$$

U may represent an m-by-m real or complex unitary matrix, where the m columns of U are commonly known as the left-singular vectors of the multi-channel audio data. S may represent an m-by-n rectangular diagonal matrix with non-negative real numbers on the diagonal, where the diagonal values of S are commonly known as the singular values of the multi-channel audio data. V* (which may denote a conjugate transpose of V) may represent an n-by-n real or complex unitary matrix, where the n columns of V* are commonly known as the right-singular vectors of the multi-channel audio data.

While described in this disclosure as being applied to multi-channel audio data comprising spherical harmonic coefficients 27, the techniques may be applied to any form of multi-channel audio data. In this way, the bitstream generation device 36 may perform a singular value decomposition with respect to multi-channel audio data representative of at least a portion of sound field to generate a U matrix representative of left-singular vectors of the multi-channel audio data, an S matrix representative of singular values of the multi-channel audio data and a V matrix representative of right-singular vectors of the multi-channel audio data, and representing the multi-channel audio data as a function of at least a portion of one or more of the U matrix, the S matrix and the V matrix.

Generally, the V* matrix in the SVD mathematical expression referenced above is denoted as the conjugate transpose of the V matrix to reflect that SVD may be applied to matrices comprising complex numbers. When applied to matrices comprising only real-numbers, the complex conjugate of the V matrix (or, in other words, the V* matrix) may be considered equal to the V matrix. Below it is assumed, for ease of illustration purposes, that the SHC 11A comprise real-numbers with the result that the V matrix is output through SVD rather than the V* matrix. While assumed to be the V matrix, the techniques may be applied in a similar fashion to SHC 11A having complex coefficients, where the output of the SVD is the V* matrix. Accordingly, the techniques should not be limited in this respect to only providing for application of SVD to generate a V matrix, but may include application of SVD to SHC 11A having complex components to generate a V* matrix.

In the context of SVD, the bitstream generation device 36 may specify the transformation information in the bitstream as a flag defined by one or more bits that indicate whether SVD (or more generally, a vector-based transformation) was applied to the SHC 27 or if other transformations or varying coding schemes were applied.

Accordingly, in a three dimensional sound field those directions at which a sound source originates may be considered the most important. As described above, a methodology is provided to rotate the sound field by calculating the direction that the main energy is present. The sound field may then be rotated in a way so that this energy, or most important spatial location, is then rotated to be in the an0 spherical harmonic coefficients. The reason for this is simple, so that when cutting out the unnecessary (i.e. below a given threshold) spherical harmonics there will likely be the least amount of needed spherical harmonic coefficients for any given order N, which is N spherical harmonics. Due to the large bandwidth required to store even these reduced HOA coefficients then a form of data compression may be required. If using the same bit-rate across all spherical harmonics, then some of the coefficients are potentially using more bits than necessary to produce perceptually transparent coding whilst other spherical harmonic coefficients do not potentially use a large enough bit-rate to make the coefficient perceptually transparent. Hence a method for allocating the bit-rate intelligently across the HOA coefficients may be required.

The techniques described in this disclosure may provide that, for the audio data rate compression of spherical harmonics, the sound field is first rotated so that, as one example, the direction where the largest energy originates is positioned into the Z-axis. With this rotation the an0 spherical harmonic coefficient may have the greatest energy as the Yn0 spherical harmonics base functions have maxima and minima lobes pointing in the Z-axis (up-down axis). Because of the nature of the spherical harmonic base functions the energy distribution will likely reside heavily in the an0 coefficient whilst least energy will be in the horizontal based an+/−n and the energy in other coefficients of m value −n<m<n will increase between m=−n and m=0 and then decrease again between m=0 and m=n. The techniques may then assign a greater bit-rate to the an0 coefficients and the least amount to the an+/−n coefficients. In this sense, the techniques may provide for dynamic bitrate allocation that varies per order and/or sub-order. The in-between coefficients for a given order likely have intermediary bit-rates. For calculating the rates a windowing function can be used (WIN) which may have p number of points for each HOA order included in the HOA signal. The rates could be applied, as one example, using the WIN factor of the difference between the high and low bit-rates. The high and low bit-rates may be defined on a per order basis of the included orders within the HOA signal. The resultant window in three dimensions would resemble kind of ‘big top’ circus tent pointing up in the Z-axis and another as its mirror pointing down in the Z-axis, where they are mirrored in the horizontal plane.

Figure 10:
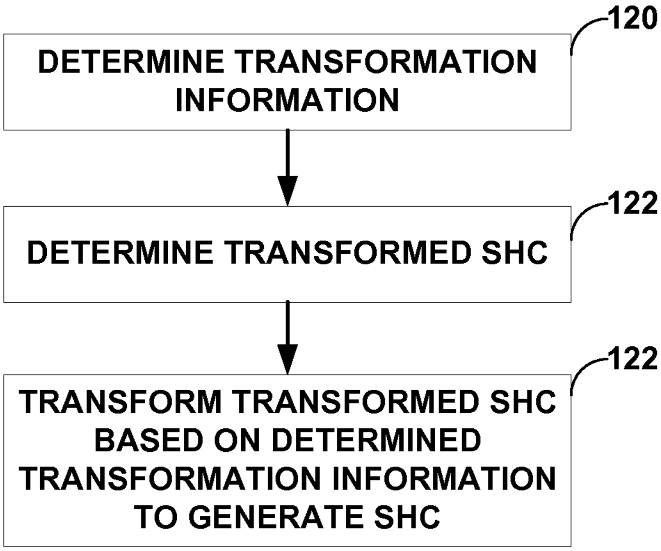
FIG. 10 is a flowchart illustrating exemplary operation of an extraction device in performing various aspects of the techniques described in this disclosure.

FIG. 10 is a flowchart illustrating exemplary operation of an extraction device, such as extraction device 38 shown in the example of FIG. 3, in performing various aspects of the techniques described in this disclosure. Initially, the extraction device 38 may determine transformation information 52 (120), which may be specified in the bitstream 31 as shown in the examples of FIGS. 7A-7E. The extraction device 38 may then determine the transformed SHC 27, as described above (122). The extraction device 38 may then transform the transformed SHC 27 based on the determined transformation information 52 to generate the SHC 27'. In some examples, the extraction device 38 may select a renderer that effectively performs this transformation based on the transformation information 52. That is, the extraction device 38 may operate in accordance with the following equation to generate the SHC 27':

$$\begin{bmatrix} SHC \\ 27' \end{bmatrix} = \begin{bmatrix} EncMat_2 \\ (25\times 32) \end{bmatrix} \begin{bmatrix} \text{Renderer} \\ (32\times 25) \end{bmatrix} \begin{bmatrix} SHC \\ 27 \end{bmatrix}$$

In the foregoing equation, the [EncMat] [Renderer] can be used to transform the renderer by the same amount so that both frontal directions match up and thereby undo or counterbalance the rotation performed at the bitstream generation device.

Figure 11:
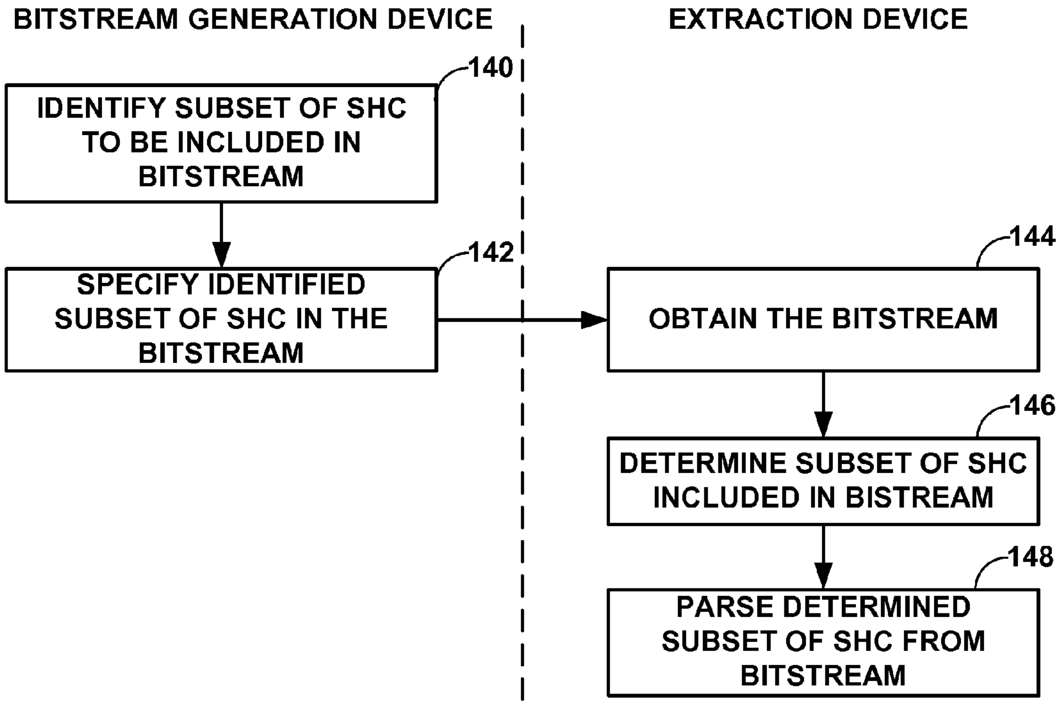
FIG. 11 is a flowchart illustrating exemplary operation of a bitstream generation device and an extraction device in performing various aspects of the techniques described in this disclosure.

FIG. 11 is a flowchart illustrating exemplary operation of a bitstream generation device, such as the bitstream generation device 36 shown in the example of FIG. 3, and an extraction device, such as the extraction device 38 also shown in the example of FIG. 3, in performing various aspects of the techniques described in this disclosure. Initially, the bitstream generation device 36 may identify a subset of SHC 27 to be included in the bitstream 31 in any of the various ways described above and shown with respect to FIGS. 7A-7E (140). The bitstream generation device 36 may then specify the identified subset of the SHC 27 in the bitstream 31 (142). The extraction device 38 may then obtain the bitstream 31, determine the subset of the SHC 27 specified in the bitstream 31 and parse the determined subset of the SHC 27 from the bitstream.

In some examples, the bitstream generation device 36 and the extraction device 38 may perform various other aspects of the techniques in conjunction with this subset SHC signaling aspects of the techniques. That is, the bitstream generation device 36 may perform a transformation with respect to the SHC 27 to reduce the number of SHC 27 that are to be specified in the bitstream 31. The bitstream generation device 36 may then identify the subset of the SHC 27 remaining after performing this transformation in the bitstream 31 and specify these transformed SHC 27 in the bitstream 31, while also specifying the transformation information 52 in the bitstream 31. The extraction device 38 may then obtain the bitstream 31, determine the subset of the transformed SHC 27 and parse the determined subset of the transformed SHC 27 from the bitstream 31. The extraction device 38 may then recover the SHC 27 (which are shown as SHC 27') by transforming the transformed SHC 27 based on the transformation information to generate the SHC 27'. Thus, while shown separately from one another, various aspects of the techniques may be performed in conjunction with one another.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single device, module or unit for purposes of clarity, it should be understood that the techniques of this disclosure may be performed by a combination of devices, units or modules.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware Various embodiments of the techniques have been described. These and other embodiments are within the scope of the following claims.

What is claimed is:

1. A method of generating a bitstream comprised of a plurality of hierarchical elements that describe a sound field, the method comprising:

capturing, via a microphone coupled to a device, audio data representative of the plurality of hierarchical elements;

performing, by the device and to encode the plurality of hierarchical elements, a linear invertible transformation with respect to the sound field to reduce a number of the plurality of hierarchical elements that provide information relevant in describing the sound field;

specifying, by the device, transformation information in the bitstream describing how the sound field was transformed; and specifying, by the device, the reduced number of the plurality of hierarchical elements in the bitstream.

2. The method of claim 1, wherein performing the linear invertible transformation comprises rotating the sound field to reduce a number of the plurality of hierarchical elements that provide information relevant in describing the sound field, and wherein specifying the transformation information comprises specifying rotation information in the bitstream describing how the sound field was rotated.

3. The method of claim 1, wherein performing the linear invertible transformation comprises translating the sound field to reduce a number of the plurality of hierarchical elements that provide information relevant in describing the sound field, and wherein specifying the transformation information comprises specifying translation information in the bitstream describing how the sound field was translated.

4. The method of claim 1, wherein performing the linear invertible transformation comprises transforming the sound field to reduce a number of the plurality of hierarchical elements having non-zero values above a threshold value.

5. The method of claim 1, wherein performing the linear invertible transformation comprises rotating the sound field to reduce a number of the plurality of hierarchical elements having non-zero values above a threshold value, and wherein specifying the transformation information comprises specifying rotation information in the bitstream describing how the sound field was rotated.

6. The method of claim 1, wherein performing the linear invertible transformation comprises rotating the sound field to reduce a number of the plurality of hierarchical elements that provide information relevant in describing the sound field; and wherein specifying the transformation information comprises specifying Euler angles as rotation information in the bitstream, wherein the Euler angles describe how the sound field was rotated.

7. The method of claim 1, wherein performing the linear invertible transformation comprises:

performing a first rotation operation on the sound field to rotate the sound field in accordance with a first azimuth angle and a first elevation angle;

determining a first number of the plurality of hierarchical elements representative of the sound field rotated in accordance with the first azimuth angle and the first elevation angle that provide information relevant in describing the sound field;

performing a second rotation operation on the sound field to rotate the sound field in accordance with a second azimuth angle and a second elevation angle;

determining a second number of the plurality of hierarchical elements representative of the sound field rotated in accordance with the second azimuth angle and the second elevation angle that provide information relevant in describing the sound field; and selecting the first rotation operation or the second rotation operation based on a comparison of the first number of the plurality of hierarchical elements and the second number of the plurality of hierarchical elements.

8. The method of claim 1, wherein performing the linear invertible transformation comprises:

rotating the sound field for a first duration of time to reduce a number of the plurality of hierarchical elements that provide information relevant in describing the sound field for the first duration of time; and specifying, in the bitstream, first rotation information that describes how the sound field was rotated for the first duration of time;

rotating the sound field for a second duration of time to reduce the number of the plurality of hierarchical elements that provide information relevant to describing the sound field of the second duration of time based on the first rotation information; and specifying, in the bitstream, second rotation information that describes how the sound field was rotated for the second duration of time.

9. The method of claim 1, wherein performing the linear invertible transformation comprises performing a vector-based decomposition with respect to the plurality of hierarchical elements to reduce a number of the plurality of hierarchical elements, and wherein specifying the transformation information comprises specifying information in the bitstream describing that the vector-based decomposition was performed with respect to the plurality of spherical harmonic coefficients.

10. The method of claim 9, wherein performing the vector-based decomposition comprises performing one or more of a singular value decomposition (SVD), a principal component analysis (PCA), and a Karhunen-Loeve transform (KLT).

11. The method of claim 1, wherein performing the linear invertible transformation comprises transforming the plurality of hierarchical elements from a spherical harmonic domain to another domain so as to reduce the number of the hierarchical elements, and wherein specifying the transformation information comprises specifying information in the bitstream indicating that plurality of hierarchical elements were transformed form the spherical harmonics domain to the other domain.

12. The method of claim 1, further comprising assigning a bitrate to at least one subset of transformed spherical harmonic coefficients based on one or more of an order and a sub-order of a spherical basis function to which the subset of the transformed spherical harmonic coefficients corresponds, the transformed spherical harmonic coefficients having been transformed in accordance with a transform operation that transforms a sound field.

13. The method of claim 12, wherein assigning the bitrate comprises assigning, in accordance with a windowing function, different bitrates to different subsets of the transformed spherical harmonic coefficients based on one or more of the order and the sub-order of the spherical basis function to which each of the transformed spherical harmonic coefficients corresponds.

14. The method of claim 13, wherein the windowing function comprises one or more of a Hanning windowing function, a Hamming windowing function, a rectangular windowing function and a triangular windowing function.

15. The method of claim 12, further comprises specifying in the bitstream a first subset of the transformed spherical harmonic coefficients using a first bit-rate and a second subset of the transformed spherical harmonic coefficients using a second bit-rate.

16. The method of claim 12, wherein assigning the bitrate comprises dynamically assigning progressively decreasing bitrates as the sub-order of the spherical basis functions to which the transformed spherical harmonic coefficients corresponds moves away from zero.

17. The method of claim 12, wherein assigning the bitrate comprises dynamically assigning progressively decreasing bitrates as the order of the spherical basis functions to which the transformed spherical harmonic coefficients corresponds increases.

18. The method of claim 12, wherein assigning the bitrate comprises dynamically assigning different bitrates to different subsets of transformed spherical harmonic coefficients based on one or more of the order and the sub-order of the spherical basis function to which the subset of the transformed spherical harmonic coefficients corresponds.

19. A device configured to generate a bitstream comprised of a plurality of hierarchical elements that describe a sound field, the device comprising:

a microphone configured to capture audio data representative of the plurality of hierarchical elements;

a memory configured to store the plurality of hierarchical elements; and one or more processors configured to:

encode the plurality of hierarchical elements by, at least in part, performing a linear invertible transformation with respect to the sound field to reduce a number of the plurality of hierarchical elements that provide information relevant in describing the sound field; and specify transformation information in the bitstream describing how the sound field was transformed and specify the reduced number of the plurality of hierarchical elements in the bitstream.

20. The device of claim 19, wherein the one or more processors are configured to rotate the sound field to reduce a number of the plurality of hierarchical elements that provide information relevant in describing the sound field, and wherein the one or more processors are configured to specify rotation information in the bitstream describing how the sound field was rotated.

21. The device of claim 19, wherein the one or more processors are configured to translate the sound field to reduce a number of the plurality of hierarchical elements that provide information relevant in describing the sound field, and wherein the one or more processors are configured to specify translation information in the bitstream describing how the sound field was translated.

22. The device of claim 19, wherein the one or more processors are configured to perform the linear invertible transformation with respect to the sound field to reduce a number of the plurality of hierarchical elements having non-zero values above a threshold value.

23. The device of claim 19, wherein the one or more processors are configured to rotate the sound field to reduce a number of the plurality of hierarchical elements having non-zero values above a threshold value, and wherein the one or more processors are configured to specify rotation information in the bitstream describing how the sound field was rotated.

24. The device of claim 19, wherein the one or more processors are configured to rotate the sound field to reduce a number of the plurality of hierarchical elements that provide information relevant in describing the sound field, and wherein the one or more processors are configured to specify Euler angles as rotation information in the bitstream, wherein the Euler angles describe how the sound field was rotated.

25. The device of claim 19, wherein the one or more processors are configured to perform a first rotation operation on the sound field to rotate the sound field in accordance with a first azimuth angle and a first elevation angle, determine a first number of the plurality of hierarchical elements representative of the sound field rotated in accordance with the first azimuth angle and the first elevation angle that provide information relevant in describing the sound field, perform a second rotation operation on the sound field to rotate the sound field in accordance with a second azimuth angle and a second elevation angle, determine a second number of the plurality of hierarchical elements representative of the sound field rotated in accordance with the second azimuth angle and the second elevation angle that provide information relevant in describing the sound field, and select the first rotation operation or the second rotation operation based on a comparison of the first number of the plurality of hierarchical elements and the second number of the plurality of hierarchical elements.

26. The device of claim 19, wherein the one or more processors are configured to rotate the sound field for a first duration of time to reduce a number of the plurality of hierarchical elements that provide information relevant in describing the sound field for the first duration of time, specify, in the bitstream, first rotation information that describes how the sound field was rotated for the first duration of time, rotate the sound field for a second duration of time to reduce the number of the plurality of hierarchical elements that provide information relevant to describing the sound field of the second duration of time based on the first rotation information, and specify, in the bitstream, second rotation information that describes how the sound field was rotated for the second duration of time.

27. The device of claim 19, wherein the one or more processors are configured to perform a vector-based decomposition with respect to the plurality of hierarchical elements to reduce a number of the plurality of hierarchical elements, and wherein the one or more processors are configured to specify information in the bitstream describing that the vector-based decomposition was performed with respect to the plurality of spherical harmonic coefficients.

28. The device of claim 27, wherein the one or more processors are configured to, when performing the vector-based decomposition, perform one or more of a singular value decomposition (SVD), a principal component analysis (PCA), and a Karhunen-Loeve transform (KLT).

29. The device of claim 27, wherein the one or more processors are configured to transform the plurality of hierarchical elements from a spherical harmonic domain to another domain so as to reduce the number of the hierarchical elements, and wherein the one or more processors are configured to specify information in the bitstream indicating that plurality of hierarchical elements were transformed from the spherical harmonics domain to the other domain.

30. The device of claim 19, wherein the one or more processors are further configured to assign a bitrate to at least one subset of transformed spherical harmonic coefficients based on one or more of an order and a sub-order of a spherical basis function to which the subset of the transformed spherical harmonic coefficients corresponds, the transformed spherical harmonic coefficients having been transformed in accordance with a transform operation that transforms a sound field.

31. The device of claim 30, wherein the one or more processors are configured to, when assigning the bitrate, assign, in accordance with a windowing function, different bitrates to different subsets of the transformed spherical harmonic coefficients based on one or more of the order and the sub-order of the spherical basis function to which each of the transformed spherical harmonic coefficients corresponds.

32. The device of claim 31, wherein the windowing function comprises one or more of a Hanning windowing function, a Hamming windowing function, a rectangular windowing function and a triangular windowing function.

33. The device of claim 30, wherein the one or more processors are further configured to specify in the bitstream a first subset of the transformed spherical harmonic coefficients using a first bit-rate and a second subset of the transformed spherical harmonic coefficients using a second bit-rate.

34. The device of claim 30, wherein the one or more processors are configured to, when assigning the bitrate, dynamically assign progressively decreasing bitrates as the sub-order of the spherical basis functions to which the transformed spherical harmonic coefficients corresponds moves away from zero.

35. The device of claim 30, wherein the one or more processors are configured to, when assigning the bitrate, dynamically assign progressively decreasing bitrates as the order of the spherical basis functions to which the transformed spherical harmonic coefficients corresponds increases.

36. The device of claim 30, wherein the one or more processors are configured to, when assigning the bitrate, dynamically assign different bitrates to different subsets of transformed spherical harmonic coefficients based on one or more of the order and the sub-order of the spherical basis function to which the subset of the transformed spherical harmonic coefficients corresponds.

37. A device configured to generate a bitstream comprised of a plurality of hierarchical elements that describe a sound field, the device comprising:

means for capturing audio data representative of the plurality of hierarchical elements means for performing, to encode the plurality of hierarchical elements, a linear invertible transform with respect to the sound field to reduce a number of the plurality of hierarchical elements that provide information relevant in describing the sound field;

means for specifying transformation information in the bitstream describing how the sound field was transformed; and means for specifying the reduced number of the plurality of hierarchical elements in the bitstream.

38. A non-transitory computer-readable storage medium having stored thereon instructions that, when executed, cause one or more processors to:

interface with a microphone to capture audio data representative of a plurality of hierarchical elements representative of a sound field;

perform, to encode the plurality of hierarchical elements, a linear invertible transform with respect to the sound field to reduce a number of the plurality of hierarchical elements that provide information relevant in describing the sound field;

specify transformation information in the bitstream describing how the sound field was transformed; and specify the reduced number of the plurality of hierarchical elements in the bitstream.

39. A method of processing a bitstream comprised of a plurality of hierarchical elements describing a sound field, the method comprising:

parsing, by a device coupled to one or more loudspeakers, the bitstream to determine transformation information describing how the sound field was transformed to reduce a number of the plurality of hierarchical elements that provide information relevant in describing the sound field, the transformation comprising a linear invertible transformation; and when reproducing the sound field based on those of the plurality of hierarchical elements that provide information relevant in describing the sound field, transforming, by the device, the sound field to decode the plurality of hierarchical elements based on the transformation information to reverse the transformation performed to reduce the number of the plurality of hierarchical elements;

rendering, by the device, the plurality of hierarchical elements to one or more speaker feeds; and outputting, by the device, the one or more speaker feeds to drive the one or more loudspeakers.

40. The method of claim 39, wherein parsing the bitstream to determine the transformation information comprises parsing the bitstream to determine rotation information describing how the sound field was rotated to reduce a number of the plurality of hierarchical elements that provide information relevant in describing the sound field, and wherein transforming the sound field comprises, when reproducing the sound field based on those of the plurality of hierarchical elements that provide information relevant in describing the sound field, rotating the sound field based on the rotation information to reverse the rotation performed to reduce the number of the plurality of hierarchical elements.

41. The method of claim 39, wherein parsing the bitstream to determine the transformation information comprises parsing the bitstream to determine translation information describing how the sound field was translated to reduce a number of the plurality of hierarchical elements that provide information relevant in describing the sound field, and wherein transforming the sound field comprises, when reproducing the sound field based on those of the plurality of hierarchical elements that provide information relevant in describing the sound field, translating the sound field based on the translation information to reverse the translation performed to reduce the number of the plurality of hierarchical elements.

42. The method of claim 39, wherein parsing the bitstream to determine the transformation information comprises parsing the bitstream to determine transformation information describing how the sound field was transformed to reduce a number of the plurality of hierarchical elements that have non-zero values above a threshold value, and wherein transforming the sound field comprises, when reproducing the sound field based on those of the plurality of hierarchical elements that have non-zero values above the threshold value, transforming the sound field based on the transformation information to reverse the transformation performed to reduce the number of the plurality of hierarchical elements.

43. The method of claim 39, wherein parsing the bitstream to determine the transformation information comprises parsing the bitstream to determine rotation information describing how the sound field was rotated to reduce a number of the plurality of hierarchical elements that have non-zero values above a threshold value, and wherein transforming the sound field comprises, when reproducing the sound field based on those of the plurality of hierarchical elements that have non-zero values above the threshold value, rotating the sound field based on the rotation information to reverse the rotation performed to reduce the number of the plurality of hierarchical elements.

44. The method of claim 39, wherein parsing the bitstream to determine transformation information comprises parsing the bitstream to determine rotation information that includes Euler angles, wherein the Euler angles describe how the sound field was rotated; and wherein transforming the sound field comprises, when reproducing the sound field based on those of the plurality of hierarchical elements that have non-zero values above the threshold value, rotating the sound field based on the Euler angles.

45. The method of claim 39, wherein parsing the bitstream to determine the transformation information comprises parsing the bitstream to determine translation information describing how the plurality of hierarchical elements were decomposed using vector-based decomposition to reduce a number of the plurality of hierarchical elements, and wherein transforming the sound field comprises, when reproducing the sound field based on those of the plurality of hierarchical elements, reconstructing the plurality of hierarchical elements based on the vector-based decomposed plurality of hierarchical elements.

46. The method of claim 45, wherein the vector-based decomposition comprises one or more of a singular value decomposition (SVD), a principal component analysis (PCA), and a Karhunen-Loeve transform (KLT).

47. The method of claim 39, wherein parsing the bitstream to determine the transformation information comprises parsing the bitstream to determine translation information describing how the plurality of hierarchical elements were transformed from a spherical harmonics domain to another domain to reduce a number of the plurality of hierarchical elements, and wherein transforming the sound field comprises, when reproducing the sound field based on those of the plurality of hierarchical elements, reconstructing the plurality of hierarchical elements based on the transformed plurality of hierarchical elements.

48. A device configured to process a bitstream comprised of a plurality of hierarchical elements describing a sound field, the device comprising:

a memory configured to store at least a portion of the bitstream;

one or more processors configured to parse the bitstream to determine transformation information describing how the sound field was transformed to reduce a number of the plurality of hierarchical elements that provide information relevant in describing the sound field, the transformation comprising a linear invertible transformation, when reproducing the sound field based on those of the plurality of hierarchical elements that provide information relevant in describing the sound field, transform the sound field to decode the plurality of hierarchical elements based on the transformation information to reverse the transformation performed to reduce the number of the plurality of hierarchical elements, and render the plurality of hierarchical elements to one or more speaker feeds; and one or more loudspeakers configured to reproduce the sound field based on the one or more speaker feeds.

49. The device of claim 48, wherein the one or more processors are further configured to, when parsing the bitstream to determine the transformation information, parse the bitstream to determine rotation information describing how the sound field was rotated to reduce a number of the plurality of hierarchical elements that provide information relevant in describing the sound field, and wherein the one or more processors are further configured to, when transforming the sound field, rotate, when reproducing the sound field based on those of the plurality of hierarchical elements that provide information relevant in describing the sound field, the sound field based on the rotation information to reverse the rotation performed to reduce the number of the plurality of hierarchical elements.

50. The device of claim 48, wherein the one or more processors are further configured to, when parsing the bitstream to determine the transformation information, parse the bitstream to determine translation information describing how the sound field was translated to reduce a number of the plurality of hierarchical elements that provide information relevant in describing the sound field, and wherein the one or more processors are further configured to, when transforming the sound field, translate, when reproducing the sound field based on those of the plurality of hierarchical elements that provide information relevant in describing the sound field, the sound field based on the translation information to reverse the translation performed to reduce the number of the plurality of hierarchical elements.

51. The device of claim 48, wherein the one or more processors are further configured to, when parsing the bitstream to determine the transformation information, parse the bitstream to determine transformation information describing how the sound field was transformed to reduce a number of the plurality of hierarchical elements that have non-zero values above a threshold value, and wherein the one or more processors are further configured to, when transforming the sound field, transform, when reproducing the sound field based on those of the plurality of hierarchical elements that have non-zero values above the threshold value, the sound field based on the transformation information to reverse the transformation performed to reduce the number of the plurality of hierarchical elements.

52. The device of claim 48, wherein the one or more processors are further configured to, when parsing the bitstream to determine the transformation information, parse the bitstream to determine rotation information describing how the sound field was rotated to reduce a number of the plurality of hierarchical elements that have non-zero values above a threshold value, and wherein the one or more processors are further configured to, when transforming the sound field, rotate, when reproducing the sound field based on those of the plurality of hierarchical elements that have non-zero values above the threshold value, the sound field based on the rotation information to reverse the rotation performed to reduce the number of the plurality of hierarchical elements.

53. The device of claim 48, wherein the one or more processors are further configured to, when parsing the bitstream to determine transformation information, parse the bitstream to determine rotation information that includes Euler angles, wherein the Euler angles describe how the sound field was rotated; and wherein the one or more processors are further configured to, when transforming the sound field, rotate, when reproducing the sound field based on those of the plurality of hierarchical elements that have non-zero values above the threshold value, the sound field based on the Euler angles.

54. The device of claim 48, wherein the one or more processors are configured to, when parsing the bitstream to determine the transformation information, parse the bitstream to determine translation information describing how the plurality of hierarchical elements were decomposed using vector-based decomposition to reduce a number of the plurality of hierarchical elements, and wherein the one or more processors are configured to, when transforming the sound field, reconstruct, when reproducing the sound field based on those of the plurality of hierarchical elements, the plurality of hierarchical elements based on the vector-based decomposed plurality of hierarchical elements.

55. The device of claim 54, wherein the vector-based decomposition comprises one or more of a singular value decomposition (SVD), a principal component analysis (PCA), and a Karhunen-Loeve transform (KLT).

56. The device of claim 54, wherein the one or more processors are configured to, when parsing the bitstream to determine the transformation information, parse the bitstream to determine translation information describing how the plurality of hierarchical elements were transformed from a spherical harmonics domain to another domain to reduce a number of the plurality of hierarchical elements, and wherein the one or more processors are configured to, when transforming the sound field comprises, reconstruct, when reproducing the sound field based on those of the plurality of hierarchical elements, the plurality of hierarchical elements based on the transformed plurality of hierarchical elements.

57. A device configured to process a bitstream comprised of a plurality of hierarchical elements describing a sound field, the device comprising:

means for parsing the bitstream to determine transformation information describing how the sound field was transformed to reduce a number of the plurality of hierarchical elements that provide information relevant in describing the sound field, the transformation comprising a linear invertible transformation;

means for transforming, when reproducing the sound field to decode the plurality of hierarchical elements based on those of the plurality of hierarchical elements that provide information relevant in describing the sound field, the sound field based on the transformation information to reverse the transformation performed to reduce the number of the plurality of hierarchical elements;

means for rendering the plurality of hierarchical elements to one or more speaker feeds; and means for outputting the one or more speaker feeds to drive one or more loudspeakers.

58. A non-transitory computer-readable storage medium having stored thereon instructions that, when executed, cause one or more processors to:

parse the bitstream to determine transformation information describing how the sound field was transformed to reduce a number of the plurality of hierarchical elements that provide information relevant in describing the sound field, the transformation comprising a linear invertible transformation;

when reproducing the sound field based on those of the plurality of hierarchical elements that provide information relevant in describing the sound field, transform the sound field to decode the plurality of hierarchical elements based on the transformation information;

render the plurality of hierarchical elements to one or more speaker feeds; and output the one or more speaker feeds to drive one or more loudspeakers.

59. A method of generating a bitstream comprised of a plurality of hierarchical elements that describe a sound field, the method comprising:

capturing, by a microphone coupled to a device, audio data representative of the plurality of hierarchical elements;

performing, by the device, a vector-based transformation with respect to the plurality of hierarchical elements so as to reduce a number of the plurality of hierarchical elements, and specifying transformation information in the bitstream describing how the sound field was transformed.

60. The method of claim 59, wherein performing the vector-based transformation comprises performing one or more of a singular value decomposition (SVD), a principal component analysis (PCA), and a Karhunen-Loeve transform (KLT) with respect to the plurality of hierarchical elements.

* * * * *